United States Patent
Zhang et al.

(10) Patent No.: US 10,809,922 B2
(45) Date of Patent: Oct. 20, 2020

(54) PROVIDING DATA PROTECTION TO DESTINATION STORAGE OBJECTS ON REMOTE ARRAYS IN RESPONSE TO ASSIGNMENT OF DATA PROTECTION TO CORRESPONDING SOURCE STORAGE OBJECTS ON LOCAL ARRAYS

(71) Applicant: EMC IP Holding Company LLC, Hopkinton, MA (US)

(72) Inventors: Tianming Zhang, Hopkinton, MA (US); Girish Sheelvant, Hopkinton, MA (US); Qi Jin, Sudbury, MA (US); Nagasimha Haravu, Apex, NC (US); Michael Zeldich, Newton, MA (US); Sathish Janamanchi, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 107 days.

(21) Appl. No.: 16/048,486

(22) Filed: Jul. 30, 2018

(65) Prior Publication Data
US 2020/0034051 A1 Jan. 30, 2020

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0632* (2013.01); *G06F 3/0683* (2013.01)

(58) Field of Classification Search
CPC ...... G06F 3/0619; G06F 3/0632; G06F 3/065; G06F 3/0683; G06F 3/0634; G06F 3/0605; G06F 3/0689; G06F 3/067
See application file for complete search history.

(56) References Cited

U.S. PATENT DOCUMENTS

| | | | |
|---|---|---|---|
| 8,706,833 B1 * | 4/2014 | Bergant | G06F 16/1756 709/214 |
| 8,924,352 B1 | 12/2014 | Andruss et al. | |
| 8,966,382 B1 * | 2/2015 | Yehuda | G06F 3/0484 715/762 |
| 9,323,789 B1 | 4/2016 | Elliott, IV | |
| 9,448,894 B1 * | 9/2016 | Barcello | G06F 16/128 |
| 9,645,851 B1 | 5/2017 | Elliott, IV | |
| 9,736,007 B1 | 8/2017 | Bouchard et al. | |

(Continued)

*Primary Examiner* — Glenn Gossage
(74) *Attorney, Agent, or Firm* — BainwoodHuang

(57) ABSTRACT

A data protection technique involves, based on a first set of policies on a first storage array, generating a second set of policies on a second storage array to track the first set. The first array maintains a first storage object, and the second array maintains a second storage object as a replica of the first storage object. The technique further includes detecting assignment of the first set of policies to the first storage object and, in response to such detection, assigning the second set of policies to the second storage object. Application of a set of storage policies to a storage object may be delayed if the storage object is a replication destination. A policy group may identify multiple data protection rules or policies, which may include a snapshot rule and/or replication rule, and a user may be prevented from directly making a rule modification to a policy group. An orphan policy group cleanup operation may be performed to delete orphan policy groups.

20 Claims, 13 Drawing Sheets

(56) References Cited

U.S. PATENT DOCUMENTS

| | | | |
|---|---|---|---|
| 9,805,075 B1 | 10/2017 | Bachu et al. | |
| 9,881,014 B1 | 1/2018 | Bono et al. | |
| 9,916,202 B1 | 3/2018 | Seela et al. | |
| 9,983,942 B1 | 5/2018 | Seela et al. | |
| 10,089,148 B1 * | 10/2018 | Blitzer | G06F 9/5027 |
| 2005/0120025 A1 * | 6/2005 | Rodriguez | G06F 16/21 |
| 2010/0146600 A1 * | 6/2010 | Eldar | G06F 21/6218 |
| | | | 726/5 |
| 2016/0004721 A1 * | 1/2016 | Iyer | G06F 16/128 |
| | | | 707/649 |
| 2016/0077926 A1 * | 3/2016 | Mutalik | G06F 11/1456 |
| | | | 711/162 |
| 2020/0034041 A1 * | 1/2020 | Zhang | G06F 3/0619 |

\* cited by examiner

| Association Identifier Field 350 | Data Protection Group/Rule Identifier Field 352 | Storage Object Identifier Field 354 | Replication Status Field 356 | Active/Inactive State Field 358 | Other Fields 360 |
|---|---|---|---|---|---|
| aabbdfdf | Policy Group 100 | LUN_1 on Array_A | Destination | Inactive | ... |
| aabbccaa | Policy Group 100 | LUN_2 on Array_A | Source | Active | ... |
| aabbffff | Policy Group 100' | LUN_1 on Array_B | Source | Active | ... |
| aabbffcc | Policy Group 100' | LUN_2 on Array_B | Destination | Inactive | ... |
| ... | ... | ... | ... | ... | ... |

FIG. 10

PROVIDING DATA PROTECTION TO DESTINATION STORAGE OBJECTS ON REMOTE ARRAYS IN RESPONSE TO ASSIGNMENT OF DATA PROTECTION TO CORRESPONDING SOURCE STORAGE OBJECTS ON LOCAL ARRAYS

BACKGROUND

Data storage systems save host data within and retrieve host data from local storage resources in response to write and read commands from host computers. Examples of local storage resources include volumes which are accessible via block-based operations and files which are accessible via file-based operations. A data storage system may replicate a local storage resource containing host data to another data storage system. In such a situation, if a host computer loses access to the data storage system having the local storage resource, the host computer can access a replicated storage resource containing the host data from the other data storage system.

SUMMARY

Unfortunately, there are deficiencies to the above described conventional data storage system that replicates a local storage resource to a remote data storage system. In particular, data protection schemes that are performed on the local storage resource are not automatically duplicated for the replicated storage resource on the remote data storage system.

For example, suppose that a human administrator manually customizes data protection for a particular production volume on a local data storage system. In particular, suppose that the human administrator enters a command to configure the local data storage system to capture a snapshot of the production volume every 30 minutes and retain each snapshot for 2 weeks. Additionally, suppose that the human administrator enters another command to configure the local data storage system to replicate the particular production volume to a replica volume on a remote data storage system using a recovery point objective (RPO) of 10 minutes.

Now suppose that a failover event has occurred which causes a host computer to write host data to and read host data from the replica volume on the remote data storage rather than to/from the particular production volume on the local data storage system (e.g., planned maintenance in which the replication direction is reversed). In such a situation, the replica volume on the remote data storage system, which is now being used as the source of production host data, does not receive the same customized data protection for the particular production volume on the local data storage system. Moreover, if the human administrator wishes to provide the same customized data protection to the replica volume on the remote data storage system, the human administrator needs to manually customize the remote data storage system to provide the same data protection (e.g., by entering commands on the remote data storage system).

In contrast to the above-described conventional data storage system which does not automatically duplicate data protection for a replicated storage resource on a remote data storage system, improved techniques provide automatic assignment of data protection policies (or rules), which are assigned to source storage objects on local data storage arrays, to corresponding destination storage objects on remote data storage arrays (i.e., replicated storage objects). Accordingly, if there is a failover event that causes a host computer to lose access to a source storage object on a local data storage array and to then access the corresponding destination storage object on a remote data storage array as a new primary source of host data (e.g., after failover), the corresponding destination storage object automatically receives the same data protection level as the original source storage object. Such techniques not only remove the manual human administrator steps (e.g., manually entering individual commands) to configure data protection on replicated host data when the replicated host data becomes the new primary source, but also allow the same levels of local and remote data protection to be provided to source and destination storage objects.

One embodiment is directed to a method of providing data protection among data storage arrays. The method includes, based on a first set of data protection policies on a first data storage array, generating, by a policy engine, a second set of data protection policies on a second data storage array to track the first set of data protection policies on the first data storage array. The first data storage array maintains a first storage object. Additionally, the second data storage array maintains a second storage object as a replica of the first storage object maintained by the first data storage array. The method further includes detecting, by the policy engine, assignment of the first set of data protection policies to the first storage object maintained by the first data storage array. The first data storage array provides data protection to the first storage object in accordance with the first set of data protection policies in response to the assignment of the first set of data protection policies to the first storage object. The method further includes, in response to detecting the assignment of the first set of data protection policies to the first storage object maintained by the first data storage array, automatically assigning, by the policy engine, the second set of data protection policies to the second storage object maintained by the second data storage array. The second data storage array provides data protection to the second storage object in accordance with the second set of data protection policies in response to the automatic assignment of the second set of data protection policies to the second storage object.

In some arrangements, each data storage array of the first data storage array and the second data storage array is constructed and arranged to (i) apply a set of data protection policies to a storage object maintained by that data storage array when the set of data protection policies is assigned to that storage object and when that storage object is a replication source, and (ii) delay applying (or enforcing) the set of data protection policies to that storage object maintained by that data storage array when the set of data protection policies is assigned to that storage object and when that storage object is a replication destination. Additionally, the first storage object initially is a replication source, and the first data storage array applies the first set of data protection policies to the first storage object in accordance with the first set of data protection policies in response to (i) assignment of the first set of data protection policies to the first storage object and (ii) the first storage object initially being a replication source. Furthermore, the second storage object initially is a replication destination. Also, automatically assigning the second set of data protection policies to the second storage object maintained by the second data storage array includes delaying applying the second set of data protection policies to the second storage object maintained by the second data storage array in response to (i) assignment of the second set of data protection policies to the second storage object and (ii) the second storage object initially being a replication destination.

In some arrangements, the first set of data protection policies includes a first policy group identifying multiple data protection rules. Additionally, generating the second set of data protection policies on the second data storage array to track the first set of data protection policies on the first data storage array includes forming, as at least a portion of the second set of data protection policies, a second policy group based on the first policy group, the second policy group identifying the multiple data protection rules.

In some arrangements, during assignment of the first set of data protection policies to the first storage object, the policy engine generates a first data protection association having a first policy group identifier that uniquely identifies the first policy group among other policy groups and a first storage object identifier that uniquely identifies the first storage object among other storage objects. The first data protection association is used by the data storage arrays to manage data protection for the first storage object. Additionally, automatically assigning the second set of data protection policies to the second storage object maintained by the second data storage array further includes generating a second data protection association having a second policy group identifier that uniquely identifies the second policy group among the other policy groups and a second storage object identifier that uniquely identifies the second storage object among the other storage objects, the second data protection association being used by the data storage arrays to manage data protection for the second storage object.

In some arrangements, the first policy group identifies, as the multiple data protection rules, multiple snapshot rules, each of the multiple snapshot rules specifying a different snapshot creation schedule to routinely create snapshots of a storage object on a local data storage array. Additionally, forming the second policy group based on the first policy group includes configuring the second policy group to identify the multiple snapshot rules identified by the first policy group.

In some arrangements, the first policy group identifies, as the multiple data protection rules, at least one snapshot rule and at least one replication rule. Each snapshot rule identified by the first policy group specifies a different snapshot creation schedule to routinely create snapshots of a storage object on a local data storage array. Each replication rule identified by the first policy group defines different replication criteria to replicate a storage object to a remote data storage array. Additionally, forming the second policy group based on the first policy group includes configuring the second policy group to identify each snapshot rule and each replication rule identified by the first policy group.

In some arrangements, the method further includes detecting a data protection rule modification to the first policy group and, in response to detecting the data protection rule modification to the first policy group, making a corresponding data protection rule modification to the second policy group.

In some arrangements, making the corresponding data protection rule modification to the second policy group includes changing at least one data protection rule identified by the second policy group while the second policy group is assigned to the second storage object.

In some arrangements, making the corresponding data protection rule modification to the second policy group includes changing at least one data protection rule identified by the second policy group to match the data protection rules identified by the second policy group with the data protection rules identified by the first policy group.

In some arrangements, the first data storage array is constructed and arranged to process block-based input/output (I/O) requests on behalf of a set of host computers. Additionally, the first storage object is a first logical unit of storage (LUN) that stores host data based on the block-based I/O requests. Furthermore, the second storage object is a second LUN that stores host data based on the block-based I/O requests, the second LUN being different from the first LUN.

In some arrangements, the first data storage array is constructed and arranged to process file-based input/output (I/O) requests on behalf of a set of host computers. Additionally, the first storage object is a first file system that stores host data based on the file-based I/O requests. Furthermore, the second storage object is a second file system that stores host data based on the file-based I/O requests, the second file system being different from the first file system.

In some arrangements, the first data storage array and the second data storage array replicate data from the first storage object to the second storage object in accordance with the first policy group during a first time period. Additionally, the method further includes, during a second time period that is after the first time period, detecting that the second storage object has become the replication source and that the first storage object has become the replication destination.

In some arrangements, the method further includes, during the second time period and in response to detecting that (i) the second storage object has become the replication source and (ii) the first storage object has become the replication destination, automatically applying the second policy group to the second storage object, the first data storage array and the second data storage array replicating data from the second storage object to the first storage object in response to applying the second policy group to the second storage object.

In some arrangements, the policy engine configures metadata privileges to allow a user to directly make a data protection rule modification to the first policy group. Additionally, forming the second policy group includes configuring the metadata privileges to prevent a user from directly making a data protection rule modification to the second policy group.

In some arrangements, the method further includes, during a third time period that is after the second time period, receiving a user command to modify data protection imposed on the second storage object. Additionally, the method further includes, based on the metadata privileges and the user command, (i) creating a third policy group that includes at least one data protection rule that is different from the multiple data protection rules identified by the second policy group, (ii) configuring the metadata privileges to allow a user to directly make a data protection rule modification to the third policy group, (iii) terminating application of the second policy group to the second storage object, and (iv) applying the third policy group to the second storage object in place of the second policy group.

In some arrangements, the method further includes, periodically performing an orphan policy group cleanup operation to delete orphan policy groups from one or more of the data storage arrays. The orphan policy group cleanup operation (i) identifies last update times for the first policy group and the second policy group and (ii) evaluates whether to delete the first policy group and the second policy group based on the last update times as well as perhaps other criteria.

Another embodiment is directed to data storage equipment that includes memory, and control circuitry coupled to the memory. The memory stores instructions which, when carried out by the control circuitry (e.g., by the control circuitry running or executing the instructions), cause the control circuitry to:

(A) based on a first set of data protection policies on a first data storage array, generate a second set of data protection policies on a second data storage array to track the first set of data protection policies on the first data storage array, the first data storage array maintaining a first storage object, and the second data storage array maintaining a second storage object as a replica of the first storage object maintained by the first data storage array;

(B) detect assignment of the first set of data protection policies to the first storage object maintained by the first data storage array, the first data storage array providing data protection to the first storage object in accordance with the first set of data protection policies in response to the assignment of the first set of data protection policies to the first storage object; and (C) in response to detecting the assignment of the first set of data protection policies to the first storage object maintained by the first data storage array, automatically assign the second set of data protection policies to the second storage object maintained by the second data storage array, the second data storage array providing data protection to the second storage object in accordance with the second set of data protection policies in response to the automatic assignment of the second set of data protection policies to the second storage object.

Yet another embodiment is directed to a computer program product having a non-transitory computer readable medium which stores a set of instructions to provide data protection among data storage arrays. The set of instructions, when carried out by data storage equipment, causes the data storage equipment to perform a method of:

(A) based on a first set of data protection policies on a first data storage array, generating a second set of data protection policies on a second data storage array to track the first set of data protection policies on the first data storage array, the first data storage array maintaining a first storage object, and the second data storage array maintaining a second storage object as a replica of the first storage object maintained by the first data storage array;

(B) detecting assignment of the first set of data protection policies to the first storage object maintained by the first data storage array, the first data storage array providing data protection to the first storage object in accordance with the first set of data protection policies in response to assignment of the first set of data protection policies to the first storage object; and (C) in response to detecting assignment of the first set of data protection policies to the first storage object maintained by the first data storage array, automatically assigning the second set of data protection policies to the second storage object maintained by the second data storage array, the second data storage array providing data protection to the second storage object in accordance with the second set of data protection policies in response to automatic assignment of the second set of data protection policies to the second storage object.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing data protection to destination storage objects on remote data storage arrays in response to assignment of data protection to corresponding source storage objects on local data storage arrays.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 10 is a block diagram illustrating particular details of information which is managed by a policy engine.

DETAILED DESCRIPTION

Overview

An improved technique is directed to providing automatic assignment of a data protection policy (or rule), which is assigned to a source storage object on a local data storage array, to a corresponding destination storage object on a remote data storage array (i.e., a replica of the source storage object). Accordingly, if there is a failover event that causes a host computer to lose access to the source storage object on the local data storage array and subsequently access the corresponding destination storage object on the remote data storage array as the new primary source of host data (e.g., after failover), the corresponding destination storage object automatically receives the same data protection as the original source storage object. Such a technique not only removes the manual human administrator steps (e.g., manually entering individual commands) to configure data protection on the replicated host data when the replicated host data becomes the new primary source, but also allows the same levels of local and remote data protection to be provided to the source and destination storage objects.

Figure 1:
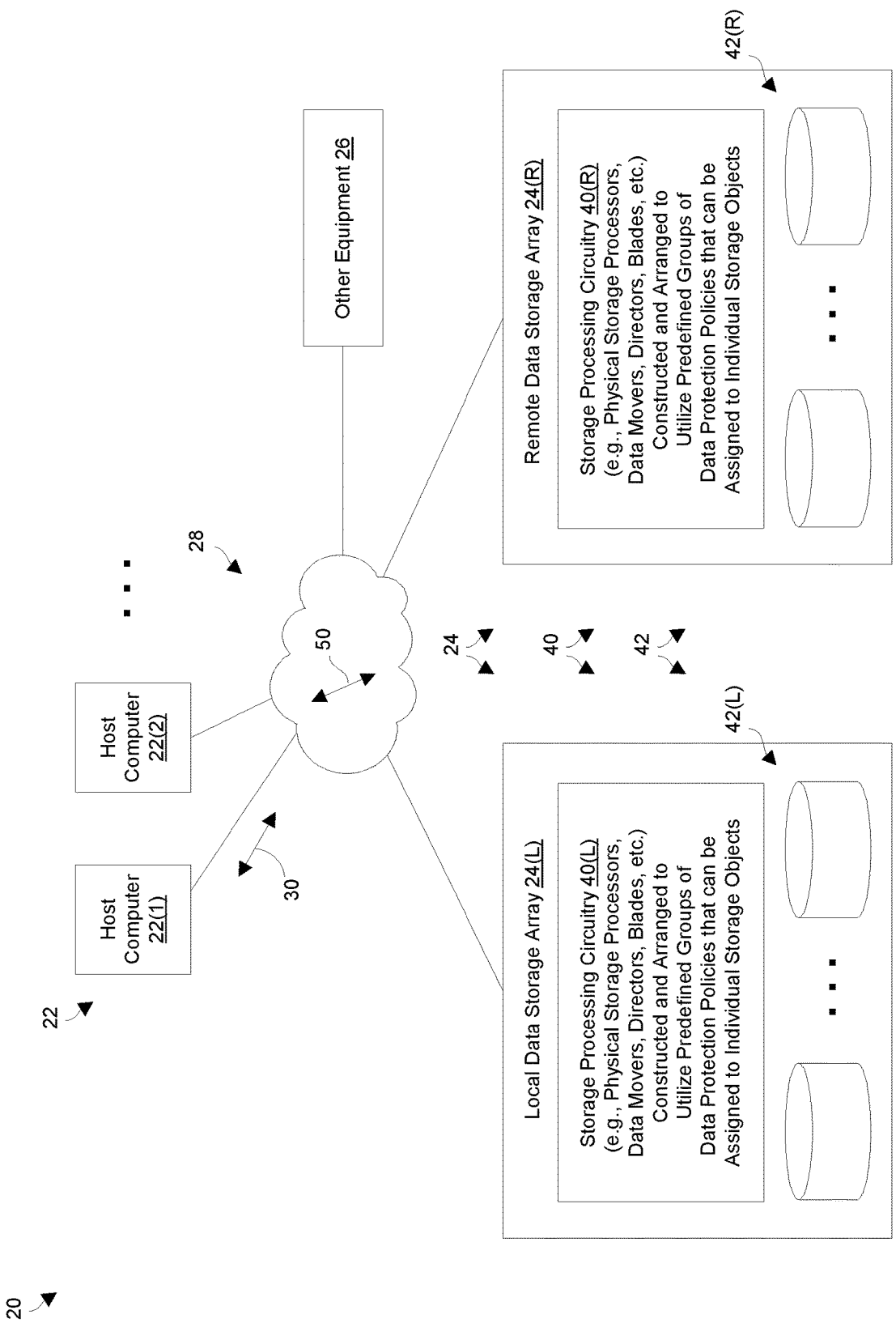
FIG. 1 is a block diagram of a data storage environment which utilizes groups of data protection policies that can be assigned to individual storage objects.

FIG. 1 shows a data storage environment 20 having equipment that utilizes groups of data protection policies that can be assigned to individual storage objects. As will be explained in further detail shortly, the data storage environment 20 provides data protection to a destination storage object on a remote data storage array in response to assignment of data protection to a corresponding source storage object on a local data storage array.

As shown in FIG. 1, the data storage environment 20 includes host computers 22(1), 22(2), . . . (collectively, host computers 22), a local data storage array 24(L) and a remote data storage array 24(R) (collectively, data storage arrays 24), other equipment 26, and a communications medium 28.

Each host computer 22 is constructed and arranged to perform useful work while storing host data 30 within, and loading host data 30 from the data storage arrays 24. For example, a host computer 22 may operate as a web server, a database server, a file server, an email server, an enterprise server, and so on, which provides I/O requests (e.g., small computer system interface or SCSI commands, file access commands, combinations thereof, etc.) to the data storage arrays 24 to store host data 30 in and read host data 30 from the data storage arrays 24.

Each data storage array 24 is constructed and arranged to perform data storage operations on behalf of one or more of the host computers 22. To this end, each data storage array 24 includes storage processing circuitry 40 to carry out the data storage operations, and physical storage devices 42 to store the host data 30 in a non-volatile or persistent manner. The storage processing circuitry 40 may include one or more physical storage processors, data movers, director boards, blades, I/O modules, storage drive controllers, switches, combinations thereof, and so on. The physical storage devices 42 may include solid state devices (SSDs), hard disk drives (HDDs), combinations thereof, etc.

As shown in FIG. 1, the local data storage array 24(L) includes storage processing circuitry 40(L) and storage devices 42(L). Likewise, the remote data storage array 24(R) includes storage processing circuitry 40(R) and storage devices 42(R). It should be understood that the terms "local" and "remote" are provided to indicate that the different data storage arrays 24(L), 24(R) are separated from each other and reside in different locations, e.g., on different electrical services, in different buildings, on different campuses, in different cities, in different states, on different coasts, etc.

The other equipment 26 represents other circuitry within the data storage environment 20 such as user devices, monitoring/administrative circuitry, appliances, other data storage arrays (e.g., downstream replication sites), and so on. Such other equipment 26 may or may not be part of the critical data storage path.

The communications medium 28 is constructed and arranged to connect the various components of the data storage environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on.

Along these lines, the communications medium 28 may include copper-based data communications devices and cabling, fiber optic devices and cabling, wireless devices, combinations thereof, etc. Furthermore, the communications medium 28 is capable of supporting SAN-based communications, LAN-based communications, cellular communications, combinations thereof, etc.

During operation, the storage processing circuitry 40 of each data storage array 24 receives I/O requests from the host computers 22, and processes the I/O requests by storing host data 30 within the local storage devices 42 of that data storage array 24 and loading host data 30 from the local storage devices 42 of that data storage array 24 on behalf of the host computers 22. It should be understood that the storage devices 42 may be arranged in a variety of configurations to robustly and reliably store the host data 30 (e.g., as RAID groups, tiered storage, log-based storage, combinations thereof, etc.). Moreover, the data storage array 24 stores the host data 30 in one or more storage objects such as volumes, logical units of storage (LUNs), consistency groups, virtual volumes, files, file systems, volumes within files, file systems within volumes, combinations thereof, and so on.

Furthermore, the data storage arrays 24 may provide a variety of data protection services to prevent data loss. In particular, each data storage array 24 supports snapshots for local data protection (e.g., to protect against a corrupted data block or file) and replication for remote data protection (e.g., to protect against a larger loss such as loss of access to that data storage array 24). Other data protection services are suitable for use as well such as RAID, mirroring, local and/or remote backups, local and/or remote archiving, and so on.

The various data protection services are invocable via user entrance of respective data protection commands. Such a data protection command may specify an individual data protection service or a group of data protection services to be applied to a particular storage object.

In connection with snapshots, a user of a data storage array 24 may create one or more snapshot rules and apply each snapshot rule to a storage object. Snapshot rules are used for local data protection. Various types of snapshot rules may be supported such as "interval" or "time of day". Other time criteria are suitable for use as well.

It should be understood that, to apply a particular snapshot rule to a particular storage object, the data storage array 24 generates an association between the snapshot rule and the storage object. In some arrangements, the association includes a snapshot rule identifier that uniquely identifies the snapshot rule among other snapshot rules, a storage object identifier that uniquely identifies the storage object among other storage objects, and code that specifies the particular details of the snapshot rule. Such an association may be implemented in the form of a data structure, a database entry, an instance, combinations thereof, and so on.

Provided below is a suitable snapshot rule definition for each data storage array 24. Included are snapshot rule properties and supported snapshot operations such as creation, modification, and deletion.

```
snap_rule_instance{
description:    Snap rule instance.
Id              string
                example: a9c64b58-59a5-45cd-80ed-
                92a4545fd080
                Snapshot rule identifier.
```

| | |
|---|---|
| Name | string |
| | example: Hourly snap rule |
| | Snapshot rule name. |
| Interval | SnapRuleIntervalEnuminteger |
| | example: 1 |
| | Interval between snaps, in minutes. Only one of interval and time_of_day can be set. Setting one will unset the other. |
| time_of_day | string($timestamp) |
| | example: 13:30 |
| | Time of the day to take a daily snap, with format "hh:mm" in 24 hour time format. |
| | Only one of interval and time_of_day can be set. |
| days_of_week | Days of the week on which the rule should be applied. |
| | Applies only for rules where time_of_day is set. Only one of interval and time_of_day can be set. |
| | DaysOfWeekEnumstring |
| | example: Sunday |
| | Days of the week. |
| retention | Integer |
| | Acceptable snapshot retention period in days. |
| list_of_policy_ids | String that identifies each policy group that utilizes this rule |
| } | |

It should be understood that one or more of the properties and/or operations may be hidden from the standard user (i.e., not exposed to or accessible by the user) for simplification purposes. Furthermore, alternative formats, definitions, etc. are suitable for use as well.

In connection with replication, a user of a data storage array 24 may create one or more replication rules and apply each replication rule to a storage object. Replication rules are used for remote data protection. In particular, in response to each replication rule, the data storage array 24 creates a replication session to replicate the storage object to another data storage array 24 (e.g., the local data storage array 24(L) may replicate host data to the remote data storage array 24(R)). In some arrangements, a replication session replicates at a regular frequency both current data of a storage object as well as locally stored snapshots of the storage object. Each replication rule may be configured to create just one replication session or multiple sessions (e.g., 1-to-N, daisy chained sessions, etc.).

To apply a particular replication rule to a particular storage object, the data storage array 24 generates an association between the replication rule and the storage object. In some arrangements, the association includes a replication rule identifier that uniquely identifies the replication rule among other replication rules, a storage object identifier that uniquely identifies the storage object among other storage objects, and code that specifies the particular details of the replication rule. Such an association may be implemented in the form of a data structure, a database entry, an instance, combinations thereof, and so on.

Provided below is a suitable replication rule definition for each data storage array 24. Included are replication rule properties and supported replication operations such as creation, modification, and deletion. It should be understood that the user may need to initially enter certain information within the local data storage array 24 to enable the local data storage array 24 to properly identify and communicate with a remote data storage array 24 before creating and applying a replication rule.

```
replication_rule_instance{
description:    Replication rule instance.
Id              string
                example: a9c64b58-59a5-45cd-80ed-
                92a4545fd080
                Replication rule identifier.
```

| | |
|---|---|
| Name | string |
| | example: Five minute RPO rule |
| | Replication rule name. |
| Rpo | RpoEnuminteger |
| | example: 5 |
| | Recover point objective (RPO). i.e., the interval between replication syncs, in minutes. |
| | Enum: |
| | Array [ 7 ] |
| io_priority | ReplicationIoPriorityEnumstring |
| | example: Low |
| | default: Medium |
| | IO priorities. |
| | Enum: |
| | Array [ 3 ] |
| remote_system_id | string |
| | Identifier of the remote system to which this rule will replicate associated objects. |
| list_of_policy_ids | String that identifies each policy group that utilizes this rule |
| } | |

In addition to individually creating and applying data protection rules to storage objects, a user of a data storage array 24 may create a policy group that identifies (or includes) multiple data protection rules and then apply the policy group to one or more storage objects. When the user applies such a policy group to a storage object, the data storage array 24 responds by applying all of the data protection rules that belong to that policy group to that storage object at once. By applying the same policy group to multiple storage objects, the user is not burdened by meticulously and repetitively typing out the same data protection rules for each storage object.

To apply a particular policy group to a particular storage object, the data storage array 24 generates an association between that policy group and the storage object. In some arrangements, the association includes a policy group identifier that uniquely identifies the policy group among other policy groups, a storage object identifier that uniquely identifies the storage object among other storage objects, and code that specifies the particular details of the policy group (e.g., a list of data protection rule identifiers, the data protection rules themselves, combinations thereof, etc.). Such an association may be implemented in the form of a data structure, a database entry, an instance, combinations thereof, and so on.

Moreover, once the user has created a policy group, the user can modify and/or delete the policy group. When modifying a policy group, the user can add one or more data protection rules to the policy group, change one or more existing data protection rules currently within the policy group, and/or remove one or more data protection rules currently within the policy group. When the user saves (or executes) such a modification, the data storage array 24 is able to automatically apply the changes to each storage object that is associated with the modified policy group. Accordingly, the user does not need to repetitively make a similar change for each storage object that the policy group is assigned to.

Provided below is a suitable policy group definition for each data storage array 24. Included are a list of properties for the data protection policy. As mentioned above, a policy group can be created, modified, and deleted. Both snapshot rules and replication rules can be added to, changed, or removed from a policy group. When a policy group contains both snapshot and replication rules, application of the policy group to a storage object provides local and remote data protection to the storage object. However, a user may also create and apply policy groups that only include snapshot rules (e.g., for local data protection only), or only include replication rules (e.g., for remote data protection only), and so on.

| | |
|---|---|
| policy_instance{ | |
| description: | Policy instance. |
| id | string |
| | example: a9c64b58-59a5-45cd-80ed-92a4545fd080 |
| | Policy identifier. |
| name | string |
| | example: Gold Policy |
| | Policy name. |
| description | string |
| | Policy description. |
| list_of_rule_ids | String that identifies each rule in this policy group |
| } | |

It should be understood that it is possible for a user to apply multiple data protection rules and/or policy groups to a storage object. In such a case, the data storage array 24 manages multiple associations that associate the multiple data protection rules and/or policy groups to that storage object.

It should be further understood that the data storage array 24 may delete (or de-associate) one or more data protection rules and/or policy groups to a storage object. In some arrangements, when the user deletes a data protection rule from a policy group, the data storage array 24 specifies a null data protection policy identifier within that policy group in place of an actual rule identifier.

Suitable identifiers include unique names, integers, alphanumeric strings, pointers, addresses, indexes, combinations thereof, and so on. Such identifiers enable the data storage arrays 24 to uniquely identify individual instances among other instances.

One should appreciate that there is no timing requirement regarding when the user creates a group of data collection policies and then applies that group to one or more storage objects. Along these lines, the user may wish to create and save several policy groups before applying any policy group and then, for each storage object under management, the user may selectively apply the created (or now predefined) policy groups to various storage objects.

Alternatively, the user may be working on a particular storage object (e.g., allocating memory to create that storage object) and, during the same working effort, create and apply a group of data collection policies to that particular storage object. Later, the user may apply that same policy group to one or more other storage objects.

It should be understood that such creation and assignment of data protection rules and/or policy groups to storage objects are imposed on the data storage arrays 24 via a policy engine that responds to commands from a user. Such a policy engine may reside within one or more of the data storage arrays 24 (e.g., see the storage processing circuitry 40) and/or externally (e.g., see the other equipment 26).

Suppose that a user assigns certain data protection for a particular storage object residing on the local storage array 24(L). In particular, suppose that the user assigns a policy group that includes a replication rule to replicate the particular storage object to a corresponding replica storage object on the remote storage array 24(R). In response to this situation, the policy engine automatically assigns a policy group to the corresponding replica storage object so that the replica storage object receives the same data protection. Such operation is an improvement to the technology because the replicated data within the replica storage object is now protected in the same manner as the source data within the particular storage object residing on the local storage array 24(L). Moreover, such operation does not require the user to manually enter individual data protection commands to protect the replicated data. Further details will now be provided with reference to FIG. 2.

Figure 2:
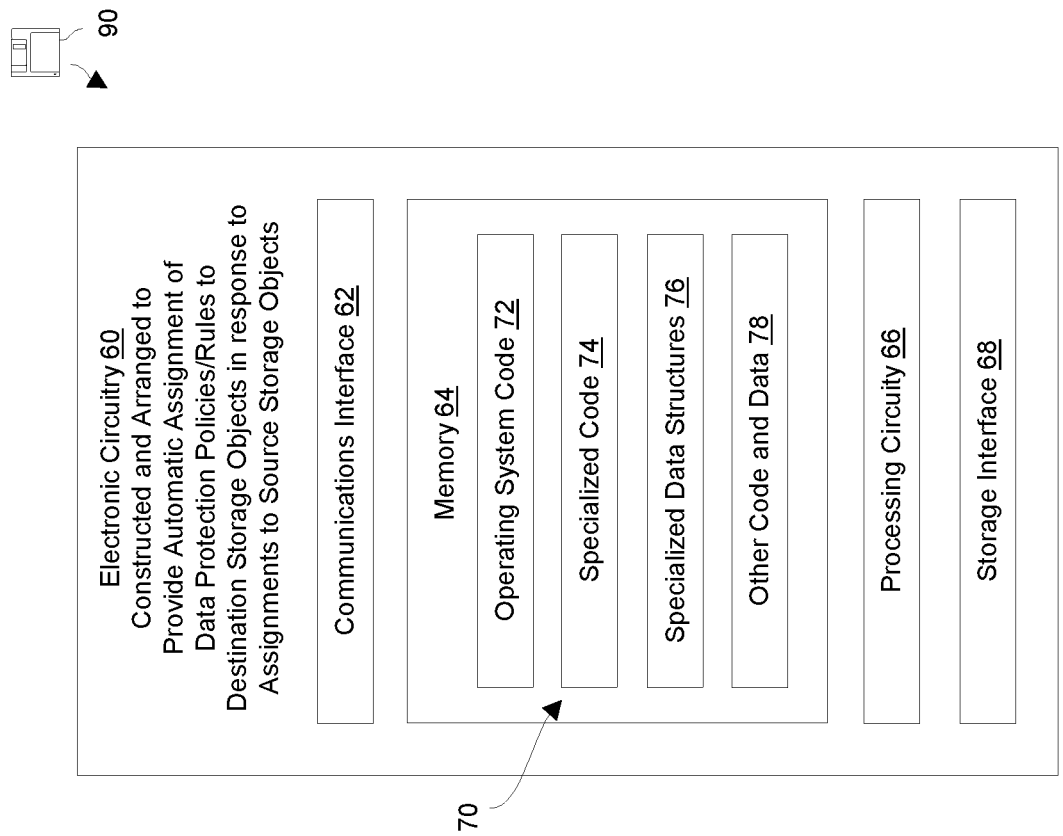
FIG. 2 is a block diagram of certain data storage equipment of the data storage environment of FIG. 1.

FIG. 2 shows specialized electronic circuitry 60 that is suitable for the storage processing circuitry 40 of each data storage array 24 (also see FIG. 1). The electronic circuitry 60 includes a communications interface 62, memory 64, and processing circuitry 66, and a storage interface 68.

The communications interface 62 is constructed and arranged to connect the electronic equipment 60 to the communications medium 28 (also see FIG. 1) to enable communications with other devices of the data storage environment 20 (e.g., the host computers 22). Such communications may be SAN-based, IP-based, cellular-based, cable-based, fiber-optic based, wireless, cloud-based, combinations thereof, and so on. Accordingly, the communications interface 62 enables the electronic equipment 60 to robustly and reliably exchange information with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including operating system code 72, specialized code 74, specialized data structures 76, and other code and data 78. The operating system code 72 is intended to refer to a kernel and other control instructions to manage computerized resources (e.g., processor cycles, memory space, etc.), drivers (e.g., an I/O stack), and so on. The specialized code 74 refers to instructions that enable utilization of data protection rules and policy groups that can be assigned to the individual storage objects (e.g., to form a policy engine). The specialized data structures 76 refers to a repository of entries (e.g., created and/or applied data protection rules and policy groups, assignments/associations, identifiers, etc.). The other code and data 78 refers to user-level applications, administrative tools, utilities, and so on. In some arrangements, storage devices 42 on a data storage array 24 (FIG. 1) may form at least a portion of the memory 64.

The processing circuitry 66 is constructed and arranged to operate in accordance with the various software constructs 70 stored in the memory 64. As will be explained in further detail shortly, the processing circuitry 66 executes the specialized code 74 and manages the specialized data structures 76 to effectively and efficiently enable a user to impose data protection on each storage object (e.g., apply a group of data protection policies to a storage object via a single operation, make policy group changes to automatically adjust data protection for multiple storage objects all at once, etc.). Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 70 to the electric circuitry 60. In particular, the computer program product 90 has a non-transitory (or non-volatile) computer readable medium which stores a set of instructions which controls one or more operations of the electric circuitry 60. Examples of suitable computer readable storage media include tangible articles of manufacture and apparatus which store instructions in a non-volatile manner such as CD-ROM, flash memory, disk memory, tape memory, and the like.

It should be understood that the processing circuitry 66, when operating in accordance with the software constructs 70 such as the specialized code 74, forms specialized circuitry that enables the user to effectively and efficiently utilize groups of data protection policies (e.g., to form a policy engine). To this end, the specialized circuitry may provide the user with a graphical user interface (GUI) from which to receive user input (e.g., user commands, parameters, etc.) as well as provide user output (e.g., status, feedback, etc.). One should appreciate that a variety of GUI techniques are suitable for use (e.g., via web browser, a custom interface, etc.).

The storage interface 68 is constructed and arranged to communicate with the storage devices 42. Suitable protocols for the storage interface 68 include SATA, SAS, PCIe, combinations thereof, and so on.

Policy Group Details

Figure 3:
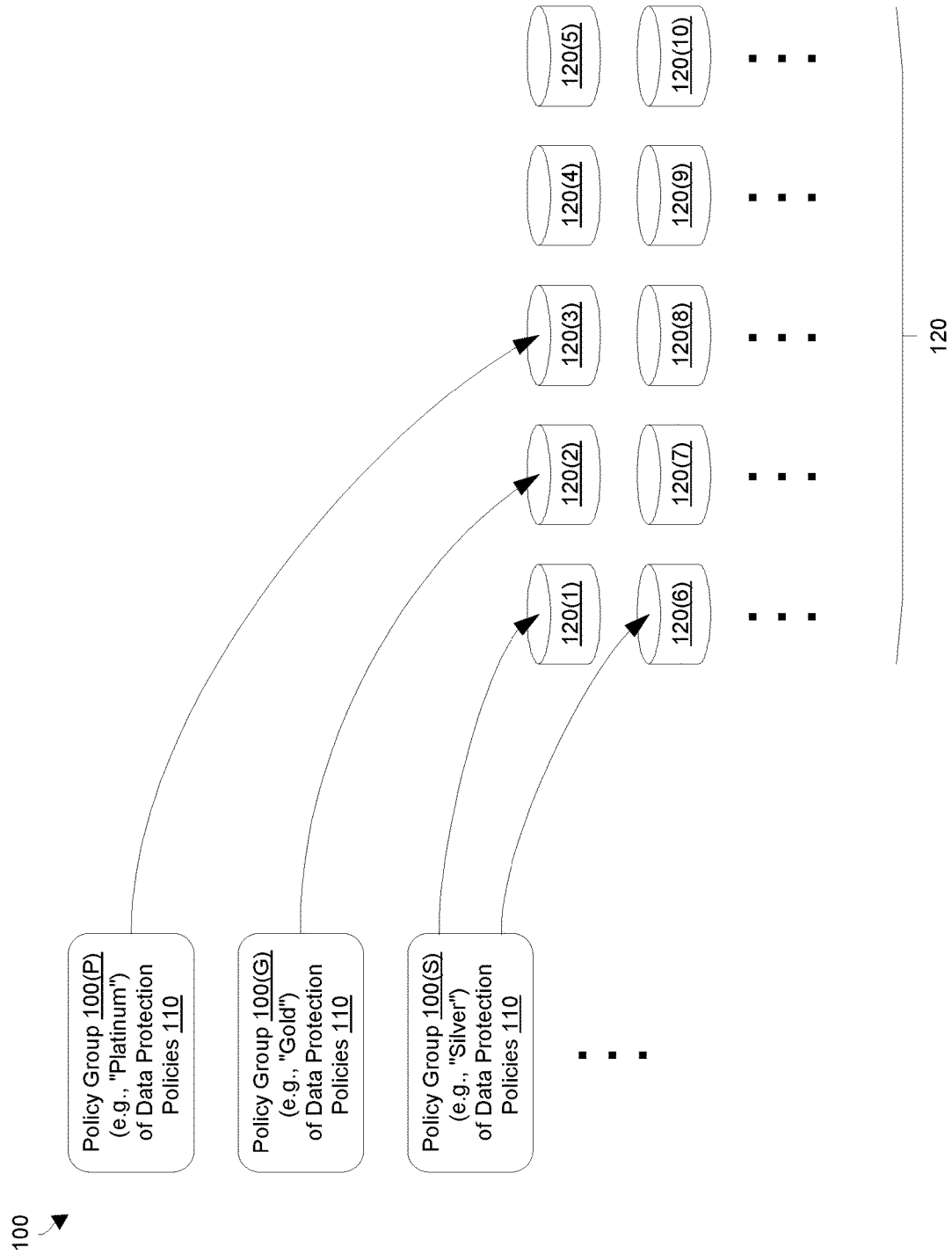
FIG. 3 is a block diagram illustrating particular policy group details of an example situation.
Figure 4:
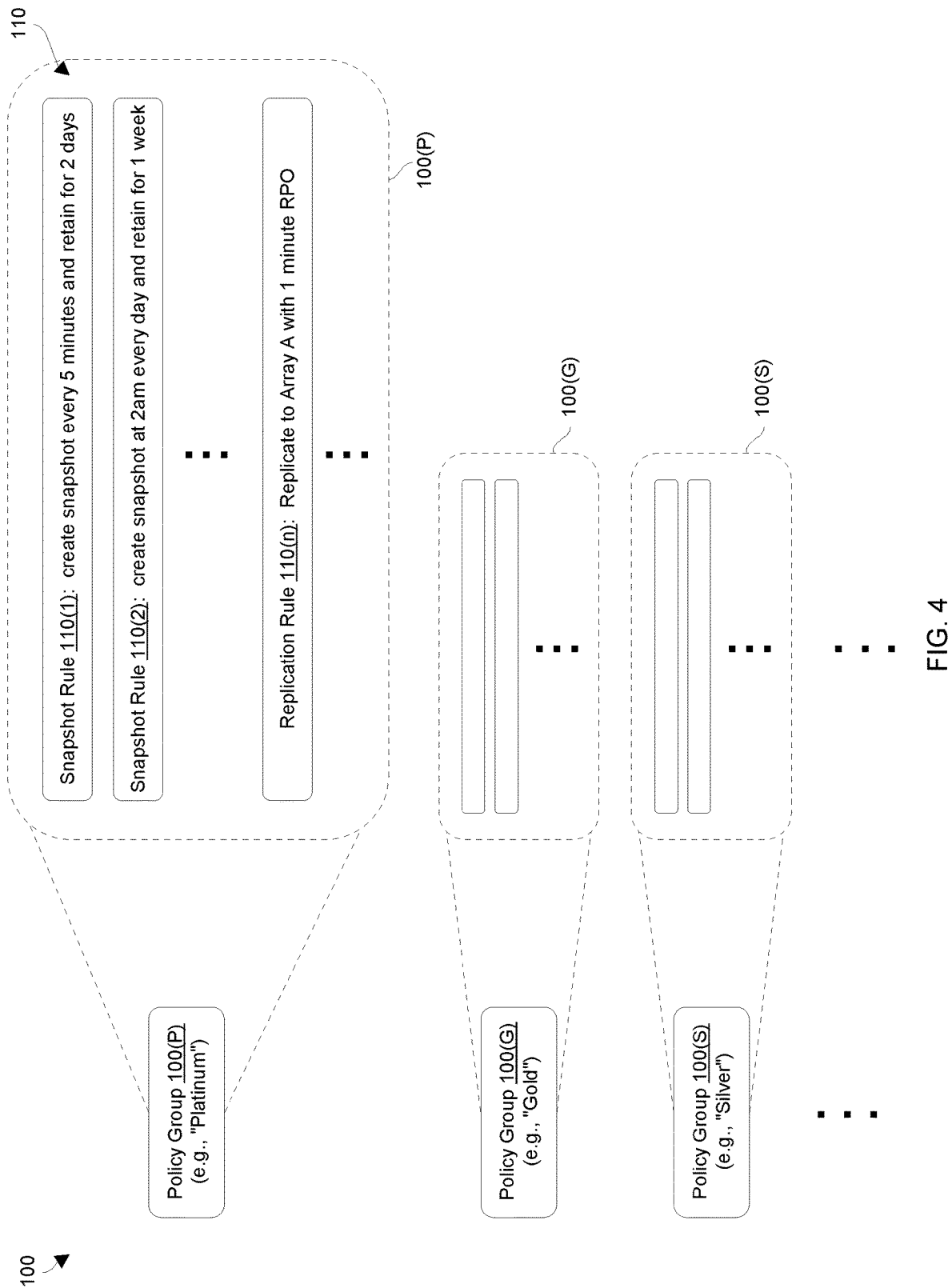
FIG. 4 is a block diagram illustrating further policy group details of the example situation.
Figure 5:
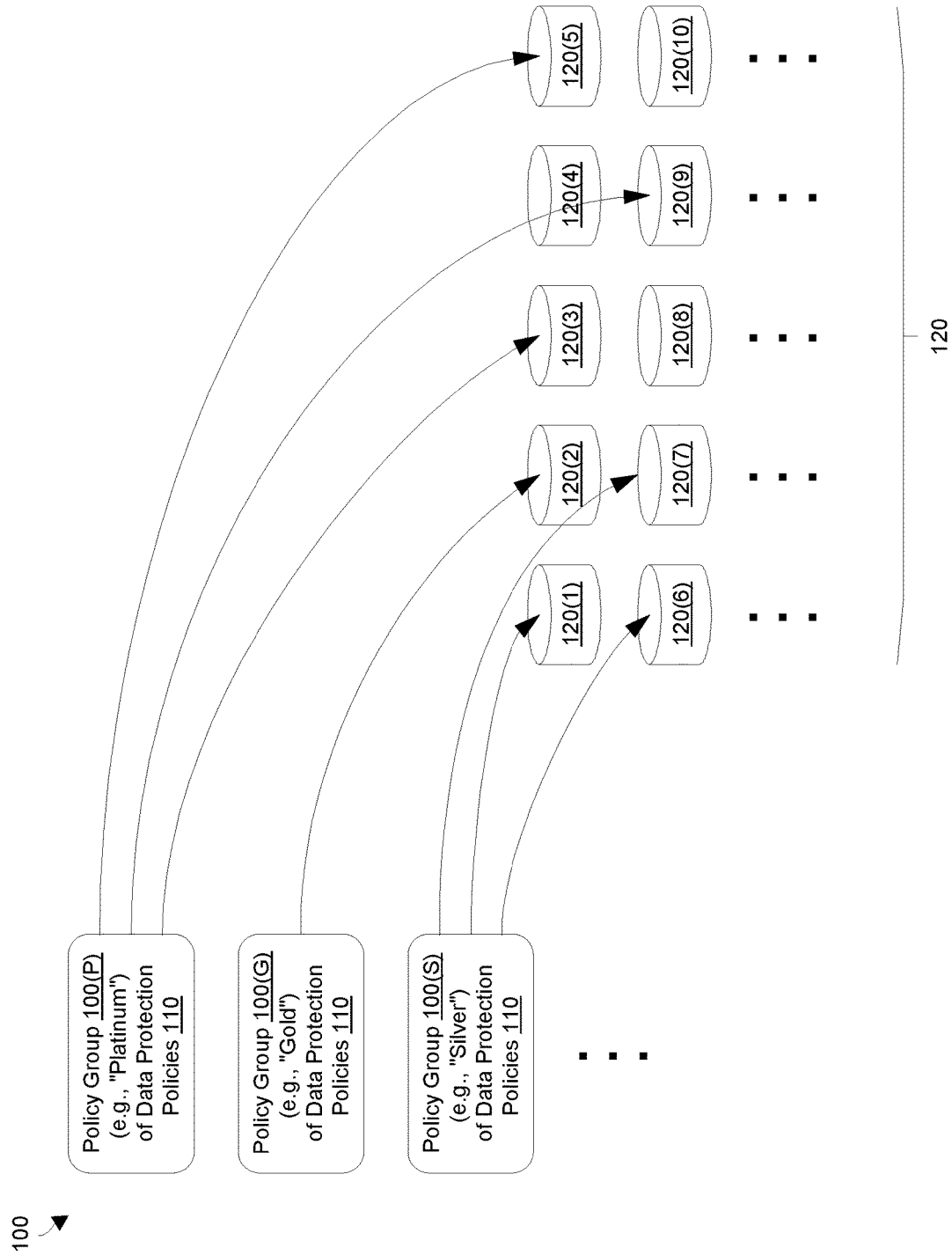
FIG. 5 is a block diagram illustrating policy group details of the example situation when a policy group is assigned to a new storage object.
Figure 6:
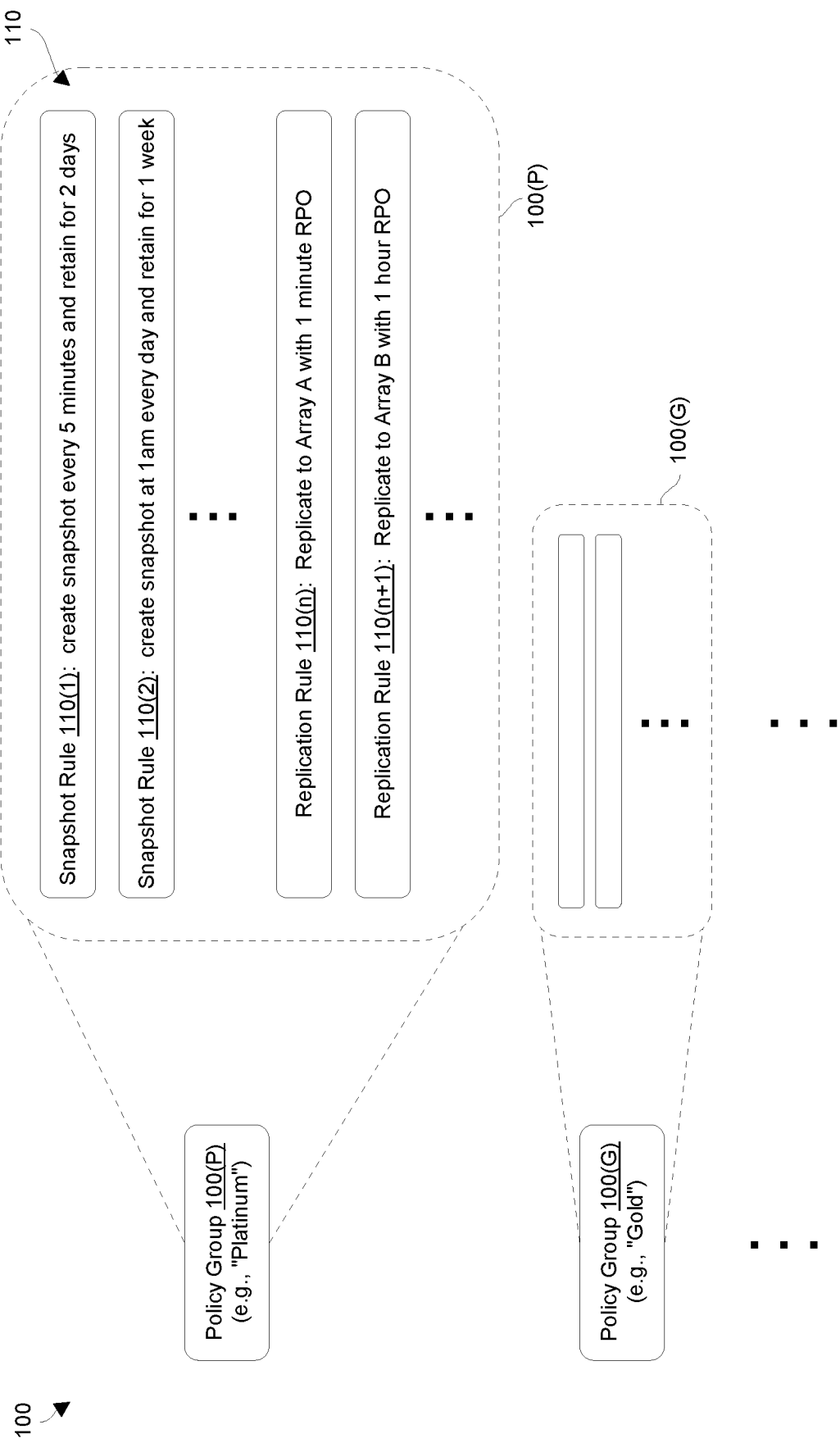
FIG. 6 is a block diagram illustrating policy group details of the example situation when a modification is made to a policy group.

FIGS. 3 through 6 show various examples to illustrate particular features in accordance with certain embodiments. FIG. 3 shows particular details of an initial data storage situation. FIG. 4 shows further details of the example situation. FIG. 5 shows details of the example situation when a new assignment is made to a particular storage object. FIG. 6 shows details of the example situation when a change is made to a particular predefined group of data protection policies.

FIG. 3 shows an example situation in which a user of a data storage array 24 (also see FIG. 1) has created and saved different groups 100 of data protection policies 110, i.e., a "platinum" policy group 100(P), a "gold" policy group 100(G), a "silver" policy group 100(S), etc. As mentioned earlier, the user may create and save the policy groups 100 prior to assigning the policy groups to storage objects 120 of the data storage array 24. Alternatively, the user may create a new policy group 100 and assign that new policy group 100 to a particular storage object 120 on the fly.

When a user assigns a policy group 100 of data protection rules 110 to a storage object 120 (e.g., via a user command), a policy engine forms an association between that policy group and the storage object 120. From that point, the policy engine applies the data protection rules 110 of the policy group 100 to protect the data within the storage object 120.

By way of example only, the "platinum" policy group 100(P) has been assigned to the storage object 120(3). Accordingly, the data storage array 24 applies all of the data protection rules 110 that belong to the "platinum" policy group 100(P) to the storage object 120(3).

Additionally, by way of example only, the "gold" policy group 100(G) has been assigned to the storage object 120(2). As a result, the data storage array 24 applies all of the data protection rules 110 that belong to the "gold" policy group 100(G) to the storage object 120(2).

Furthermore, by way of example only, the "silver" policy group 100(S) has been assigned to the storage objects 120(1) and 120(6). Thus, the data storage array 24 applies all of the data protection rules 110 that belong to the "silver" policy group 100(S) to each of the storage objects 120(1) and 120(6). It should be appreciated that the user did not need to re-type the same data protection rules 110 for each of the storage objects 120(1) and 120(6) to give the storage objects 120(1), 120(6) the same data protection. Rather, the user was able to simply assign the same policy group 100(S) to each of storage objects 120(1) and 120(6) (e.g., via respective user commands).

FIG. 4 shows certain details of the policy groups 100. In particular, each policy group 100 identifies (or includes) one or more data protection rules 110. By way of example, the "platinum" policy group 100(P) identifies, perhaps among other data protection rules 110, a snapshot rule 110(1) to create a snapshot every 5 minutes and retain that snapshot for 2 days, a snapshot rule 110(2) to create a snapshot every at 2 am every day and retain that snapshot for 1 week, and replication rule 110(n) to replicate to another data storage array 24 (e.g., "Array A") with a 1 minute RPO (recovery point objective).

It should be understood that the "platinum" policy group 100(P) may identify one or more other data protection rules 110 for snapshotting (e.g., in accordance with other time criteria) and one or more data protection rules 110 for replication (e.g., to replicate to another data storage array 24). Moreover, it should be understood that the other policy groups 100(G), 100(S), . . . may identify similar combinations and/or different combinations of data protection rules 110.

At this point, it should be clear that when a policy group 100 is assigned to a storage object 120, the data storage array 24 applies all of the data protection rules 110 that are identified by that policy group 100 to that storage object 120. Accordingly, since "platinum" policy group 100(P) is assigned to the storage object 120(3), data storage array 24 applies all of the above-mentioned data protection rules 110 identified by the "platinum" policy group 100(P) to the storage object 120(3).

FIG. 5 shows the example situation of FIG. 3 after the user has further assigned certain earlier created and saved (i.e., now predefined) policy groups 100 to other storage objects 120 of the data storage array 24. To this end, the user has entered input into a GUI to modify the operation of the data storage array 24.

Recall that the "platinum" policy group 100(P) was initially assigned only to the storage object 120(3) (also see FIG. 3). By way of example only, the user has further assigned the "platinum" policy group 100(P) to the storage objects 120(5) and 120(9). Along these lines, the user may enter a single command (e.g., via a GUI) to assign the "platinum" policy group 100(P) to the storage object 120(5). Likewise, the user may enter another single command to assign the "platinum" policy group 100(P) to the storage object 120(9). One should appreciate that, with each single command, the user is able to assign all of the data protection rules 110 identified by the "platinum" policy group 100(P) to a particular storage object 120. Such a task is less burdensome and less prone to error than a task of the user individually typing in and assigning each data protection rule 110 to each storage object 120 one by one. That is, in response to a single policy group assignment command from the user, a policy engine controlling the data storage array 24 associates the "platinum" policy group 100(P) with a particular storage object 120 (e.g., the storage object 120(3) or the storage object 120(9)). In response, the data storage array 24 applies the particular data protection rules 110 (FIG. 4) of the "platinum" policy group 100(P) to that storage object 120 (also see FIG. 4).

Likewise, recall that the "silver" policy group 100(S) was initially assigned only to the storage objects 120(1) and 120(6) (also see FIG. 3). By way of example only, the user has further assigned the "silver" policy group 100(S) to the storage object 120(7). Such assignment directs the data storage array 24 to now associate the "silver" policy group 100(S) with the storage object 120(7) in addition to earlier-formed associations with the storage objects 120(1) and 120(6). In response, the data storage array 24 now further applies the multiple data protection rules 110 identified by the "silver" policy group 100(S) (FIG. 4) to the storage object 120(7).

FIG. 6 shows the example situation after the user has made a policy group modification. By way of example, the user has modified the "platinum" policy group 100(P). In particular, the user has changed the data protection rule 110(2) of the policy group 100(P) so that a snapshot is now created at 1 am every day rather than 2 am every day. Additionally, by way of example, the user has added another data protection rule 110(n+1) to the policy group 100(P) (i.e., the user has modified the policy group 100(P) to identify another data protection rule 110) so that replication is made to another data storage array 24 (e.g., Array B) with a 1 hour RPO.

When the user commits the modification to the "platinum" policy group 100(P), the data storage array 24 applies the modification to each storage object 120 that the "platinum" policy group 100(P) is assigned to. Such operation thus enables the user to update data protection to multiple storage objects 120 all at once (e.g., to storage objects 120(3), 120(5), and 120(9) simultaneously).

In some situations, the modification may be automatic and applied immediately. For example, suppose that the modification includes reducing the snapshot retain period for certain snapshots from 2 days to 1 day (also see the data protection rule 110(1) in FIG. 4). Such an automatic and immediate application may quickly free up certain resources of the data storage array 24 such as non-volatile memory thus improving the operation of the data storage array 24.

In other situations, the data storage array 24 may prompt the user with the storage objects 120 that the "platinum" policy group 100(P) is assigned to (e.g., via the GUI in the form of a list) and enables the user to apply the "platinum" policy group 100(P) to the storage objects 120 selectively based on further user input. For example, the data storage array 24 may allow the user to save the modified policy group 100 as a new policy group 100 (e.g., a "bronze" policy group 100) and apply the new policy group 100 only to storage objects 120 that the user selects. In such a situation, the original policy group continues to apply to the non-selected storage objects 120.

Other policy group modifying methodologies are suitable for use as well. Moreover, in addition to changing and adding one or more data protection rules 110 to a policy group 100, the user may delete one or more data protection rules 110 from a policy group. Such operations enable the user to update data protection to multiple storage objects 120 without any need to separately change data protection rules 110 assigned to each storage object 120 individually. Further details will now be provided with reference to FIG. 7.

Figure 7:
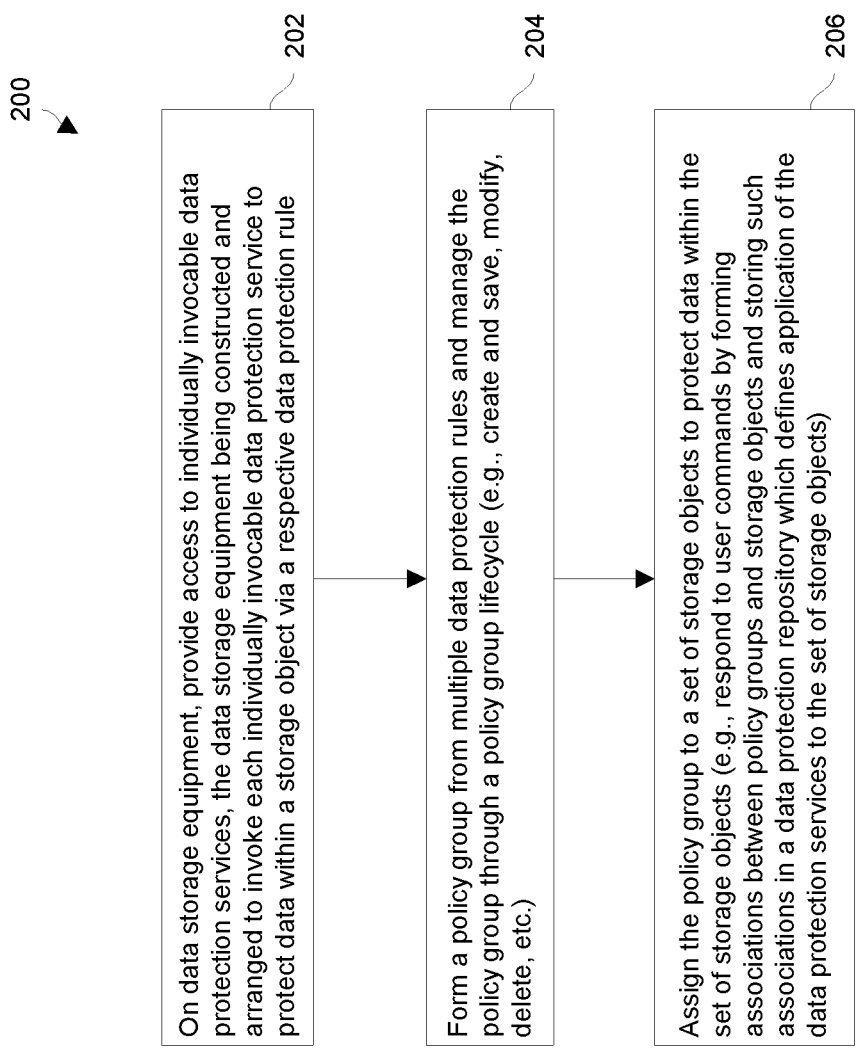
FIG. 7 is a flowchart of a procedure which is performed by the data storage equipment of FIG. 2.

FIG. 7 is a flowchart of a procedure 200 which utilizes a group of data protection policies within data storage equipment. The procedure 200 may be performed by a policy engine that imposes data protection on one or more data storage arrays 24. The policy engine may reside with the data storage arrays 24 or be external to the data storage arrays 24.

At 202, the policy engine provides access to individually invocable data protection services. Recall that the data storage arrays 24 are constructed and arranged to invoke each individually invocable data protection service to protect data within a storage object via a respective data protection rule.

At 204, the policy engine forms a policy group from multiple data protection rules. Along these lines, the policy engine creates and saves a policy group that identifies (or includes) multiple data protection rules. At this point, the policy group is assignable to one or more storage objects. Additionally, the policy group may be managed through a policy group lifecycle (e.g., the policy group may be modified, re-assigned, deleted, and so on).

At 206, the policy engine assigns the policy group to a set of storage objects to protect data within the set of storage objects. Here, the policy engine may respond to user commands by forming associations between policy groups and storage objects and saving such associations in a data protection repository. Such a data protection repository may define how the various data protection services are applied to the set of storage objects (e.g., also see the specialized data structures 76 in FIG. 2).

As described above, certain improved techniques are directed to utilizing groups 100 of data protection policies (or rules) 110 that are assignable to storage objects 120 (e.g., logical units of storage or LUNs, file systems, etc.). In particular, a user can simply assign a policy group 100 to each storage object 120. The policy group 100 may include a variety of data protection policies 110 such as one or more snapshot rules and one or more replication rules. Accordingly, the user is able to impose an entire group 100 of data protection policies 110 on each storage object 120 all at once. Moreover, the user may change a policy or policies 110 within a policy group 100 that is assigned to multiple storage objects 120 and thus adjust data protection policies 110 for the multiple storage objects 120 all at once. As a result, there is less time and effort imposed on the user compared to a human system administrator's conventional task of manually configuring each volume or file system individually. Furthermore, there is no special script writing skills required by the user thus making the user's job less complicated and less prone to error.

One should appreciate that the above-described techniques do not merely collect, store, and analyze data. Rather, the disclosed techniques involve an improvement to the technology. Along these lines, with the above-described techniques, a data storage array 24 enjoys robust and reliable data protection of one or more storage objects 120 based on specialized constructs, i.e., policy groups 100 where each policy group 100 is able to identify multiple data protection rules 110. Moreover, if a policy group 100 is assigned to multiple storage objects 120, any change to the policy group 110 invokes a change to each storage object 120 thus alleviating the need to separately make a change to the individual rules 110 applied to each storage object 120. Such changes to how the data storage array operates improves data storage array organization and efficiency.

Figure 8:
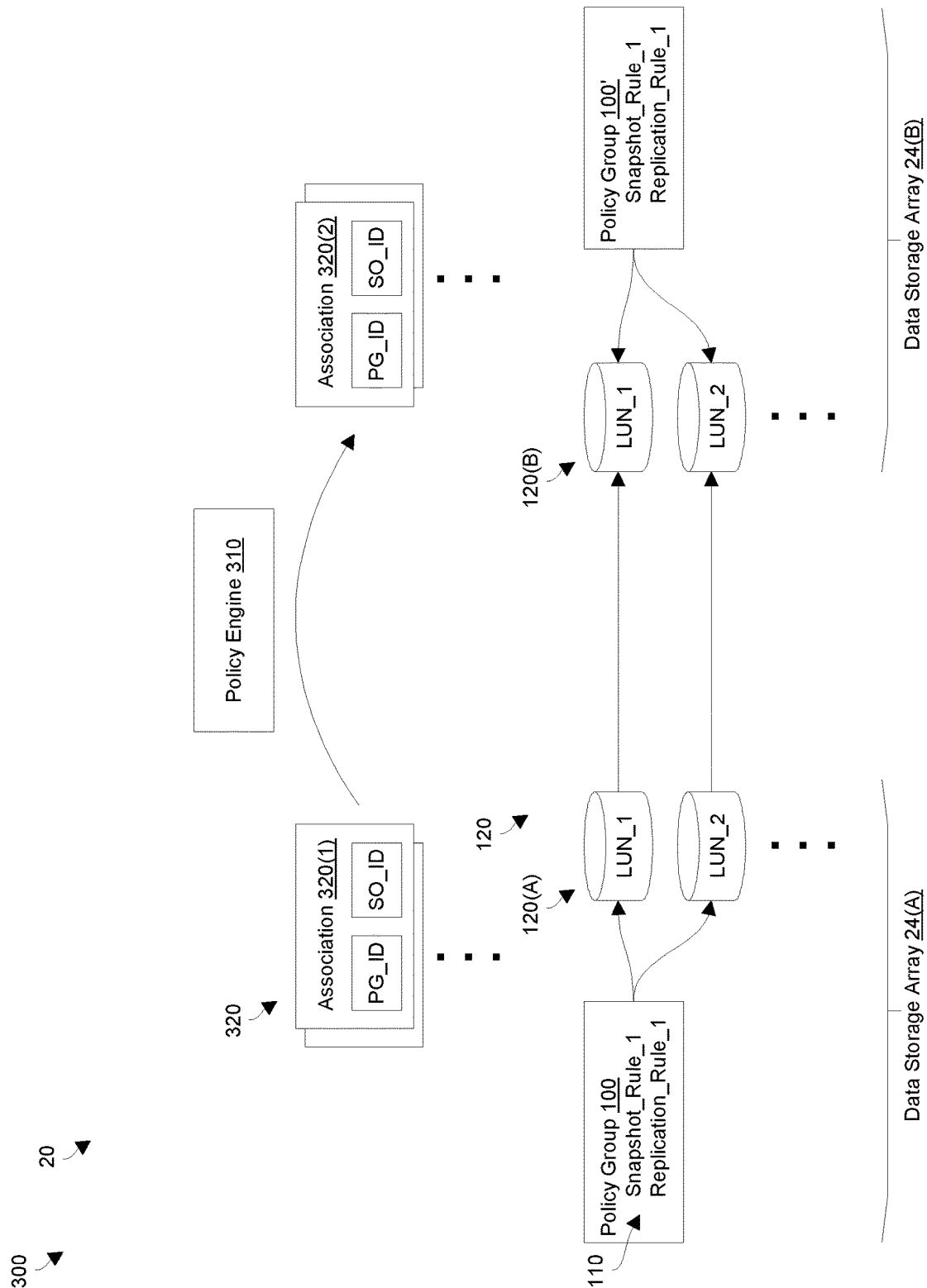
FIG. 8 is a block diagram illustrating particular details of a replication situation.
Figure 9:
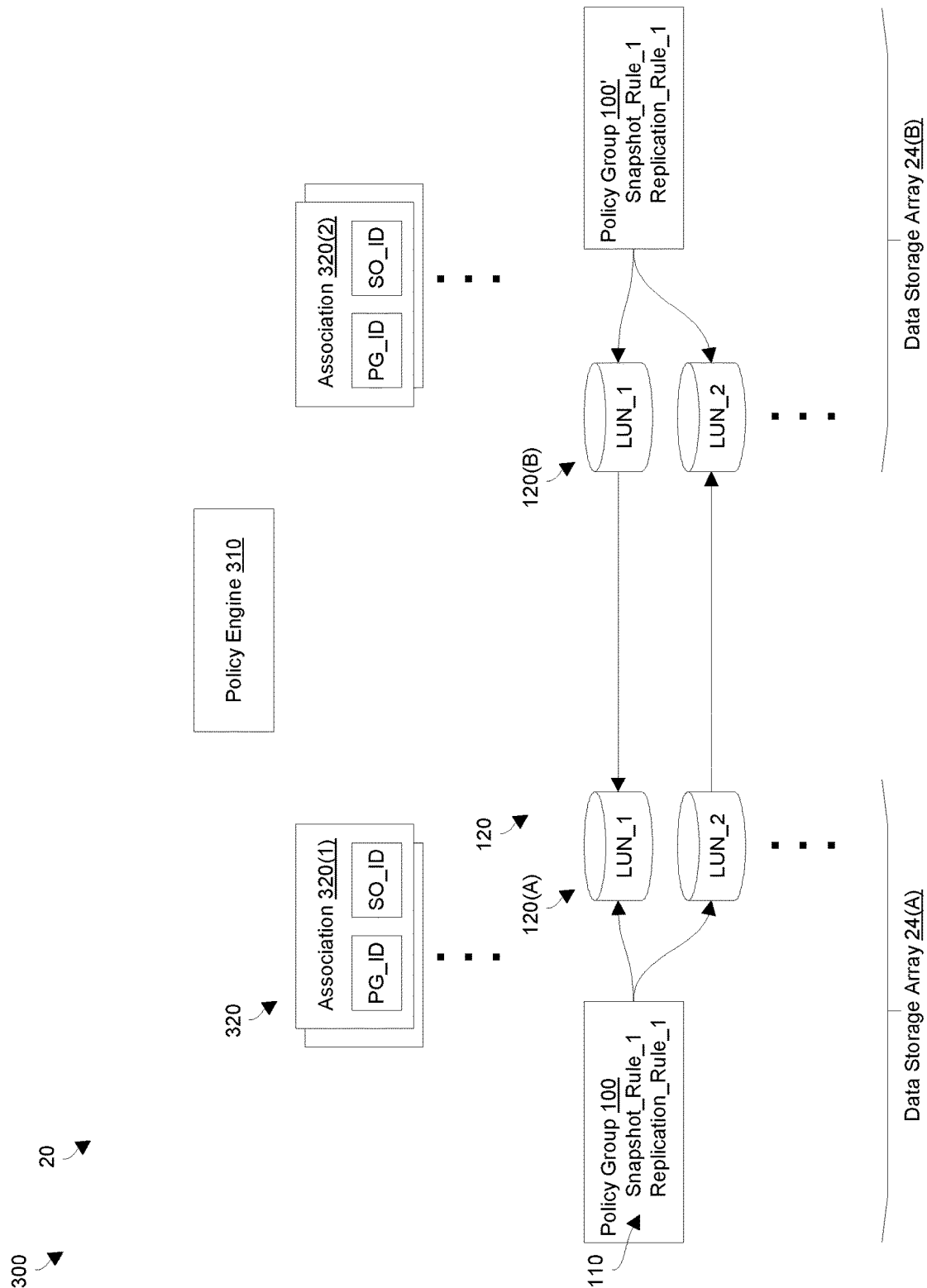
FIG. 9 is a block diagram illustrating further details of the replication situation.

Automatic Assignment of Data Protection to Corresponding Destination Storage Objects FIGS. 8 through 10 show a replication situation 300 in which the circuitry of the data storage environment 20 (also see FIG. 1) provides, among other things, remote data protection to source storage objects 120(A) residing on a data storage array 24(A) by replicating data from the source storage objects 120(A) to destination storage objects 120(B) residing on another data storage array 24(B). However, in contrast to conventional data storage systems that do not duplicate data protection on source and destination data, the circuitry of the replication situation 300 automatically assigns the same level of local and remote data protection that a user has assigned to the source storage objects 120(A) to the destination storage objects 120(B).

To this end, a policy engine 310 manages data protection for the various storage objects 120 within the data storage environment 20. Recall that the policy engine 310 may be formed by processing circuitry running in accordance with specialized code (also see FIG. 2). It should be understood that the policy engine 310 may reside within one or more data storage arrays 24, in one or more external devices 26, in the cloud, in combinations thereof in a distributed manner, and so on (also see FIG. 1).

The policy engine 310 manages data protection of storage objects 120 using metadata such as associations 320 between (i) policy groups 100 and individual data protection rules 110 and (ii) the storage objects 120 of the data storage environment 20. In particular, when a user assigns a policy group 100 or an individual data protection rule 110 to a storage object 120, the policy engine 310 creates an association 320 that identifies that assignment (e.g., associates a policy group identifier PG_ID that identifies a particular policy group with a storage object identifier SO_ID that identifies a particular storage object). Likewise, the policy engine 310 is able to update and/or create associations 320 to identify current and/or further assignments.

Along these lines, when a user enters a command to assign a policy group 100 (or a data protection rule 110) to a source storage object 120(A), the policy engine 310 creates (or updates) an association 320(1) between that policy group 100 and the source storage object 120(A). In the example shown in FIG. 8, the policy engine 310 creates a separate association 320 between a particular policy group 100 and each source storage object 120(A) (e.g., LUN_1, LUN_2, . . . on the data storage array 24(A)) in response to a user assigning that policy group 100 to each source storage object 120(A). By way of example, the same policy group 100, which identified multiple data protection rules 110, is shown as being assigned to multiple storage objects 120(A) (e.g., LUN_1 and LUN_2) to illustrate the earlier described features (also see FIGS. 3 through 6).

In response to such assignments, the policy engine 310 automatically performs specialized operations to provide the same data protection to the corresponding destination storage objects 120(B). By way of example, storage objects 120(B) LUN_1 and LUN_2 are replicated to the data storage array 24(B).

In response to each policy group assignment by the user, the policy engine 310 searches the metadata to determine whether a copy of the policy group 100 already exists and, if so, determines whether that copy is already assigned to the storage objects 120(B) that correspond to the storage objects 120(A) receiving data protection assignment. Since the copy of the policy group 100 does not yet exist, the policy engine 310 copies the original policy group 100 from the data storage array 24(A) to the data storage array 24(B) to form a policy group copy 100' (or simply policy group 100'). Along these lines, the original policy group 100 includes a snapshot rule (e.g., "Snapshot_Rule_1") and a replication rule (e.g., "Replication_Rule_1"). Accordingly, the policy group copy 100' also includes the same snapshot rule (e.g., "Snapshot_Rule_1") and the same replication rule (e.g., "Replication_Rule_1"). If the original policy group 100 included other data protection rules, the policy engine 310 would duplicate those other data protection rules within the policy group copy 100' as well.

After the policy engine 310 creates the policy group copy 100', the policy engine 310 configures the policy group copy 100' as read only. Accordingly, even though the user may be able to directly modify the original policy group 100 (i.e., the user has read and write access to the original policy group 100), the user is not permitted to directly modify the policy group copy 100'. Rather, if the user later modifies the original policy group 100, the policy engine 310 automatically mirrors the user's changes to the policy group copy 100'. Thus, it is acceptable that only the policy engine 310 is permitted to directly modify the policy group copy 100'.

Next, the policy engine 310 assigns the policy group copy 100' to each of the corresponding destination storage objects 120(B) but places the policy group copy 100' in an inactive (or dormant) state for each storage object 120(B). In particular, the policy engine creates a separate association 320(2) between the policy group copy 100' and each corresponding destination storage object 120(B) (i.e., LUN_1, LUN_2, . . . on the data storage array 24(B)) and appropriately configures each association 320(2).

At this point, the corresponding destination storage objects 120(B) have the same data protection as the source storage objects 120(A). However, the policy engine 310 maintains the policy group copy 100' is in the inactive state for each storage object 120(B) and does not immediately apply the data protection rules within the policy group copy 100' to delay snapshotting and replication of the storage objects 120(B) since the storage objects 120(B) are currently replication destinations. That is, the policy engine 310 delays application (e.g., delays enforcement of the data protection rules) of the policy group copy 100' while the storage objects 120(B) remain replication destinations.

However, if a particular storage object 120(B) becomes a production storage object (e.g., after a failover event), the policy engine 310 makes the policy group copy 100' active for that storage object 120(B). That is, the policy engine 310 modifies the particular assignment 320(2) between the policy group copy 100' and the storage object 120(B) that is no longer a replication destination and is now a replication source to indicate that the application of the policy group copy 100' is to commence. In response, the data storage arrays 24 apply (e.g., enforce) all of the data protection rules within the policy group copy 100' to that storage object 120(B).

FIG. 9 shows the replication situation 300 after occurrence of a failover event for LUN_1. Along these lines, the failover event may have been planned (e.g., due to planned maintenance, due to an upgrade, etc.).

As shown in FIG. 9, the replication direction between the storage objects 120(A), 120(B) for LUN_1 is now reversed. In particular, the storage object 120(B) for LUN_1 on the data storage array 24(A) is now the replication source and the storage object 120(A) for LUN_1 is now the replication destination on the data storage array 24(B).

In response to the failover event, the policy engine 310 automatically transitions the association 320(2) that associates the policy group copy 100' with the storage object 120(B) for LUN_1 from the inactive state to the active state. In response, application of the data protection rules 110 of the policy group copy 100' is no longer delayed. Rather, the data storage arrays 24 now operate to apply the data protection rules 110 of the policy group copy 100'. Accordingly, Snapshot_Rule_1 and Replication_Rule_1 are now applied to the storage object 120(B) for LUN_1.

It should be understood that the above-described example shows the replication direction being reversed for simplicity. If the failover event was unplanned (e.g., due to an equipment failure, due to an extended power outage, etc.), the same techniques are suitable for applying remote data protection from the data storage array 24(B) to another data storage array 24.

FIG. 10 shows example metadata 330 which is managed by the policy engine 310. At least a portion of this metadata 330 may take the form of an association database or repository that stores the associations 320 (FIGS. 8 and 9), and includes association entries 340(1), 340(2), 340(3), 340(4), . . . (collectively, association entries 340). In some arrangements, the metadata 330 resides in a central location (e.g., within a particular data storage array 24, at a central server, in the cloud, etc.). In other arrangements, the metadata 330 is distributed across multiple locations (e.g., distributed among the data storage arrays 24).

Each association entry 340 identifies a particular association 320 and includes an association identifier field 350, a data protection group/rule identifier field 352, a storage object identifier field 354, a replication status field 356, an active/inactive state field 358, and other fields 360. The association identifier field 350 of each association entry 340 stores an association identifier that uniquely identifies the particular association 320 among the other associations 320 of the data storage environment 20. The data protection group/rule identifier field 352 stores a data protection group or rule identifier that uniquely identifies a data protection group 100 or data protection rule 110 among other data protection groups/rules 100/110. The storage object identifier field 354 stores a storage object identifier that uniquely identifies a storage object 120 among other data storage objects 120. The replication status field 356 stores a status indicator which indicates whether the storage object 120 is a replication source or a replication destination. The active/inactive state field 358 stores a state indicator which indicates whether the data protection policy/rule 100/110 is inactive or active. The other fields 360 store other information such as timestamps indicating the last update times, access privileges (e.g., read only, read/write, etc.), and so on.

As shown in FIG. 10, the association entry 340(1) identifies an association 320 between the policy group 100 and the storage object 120(A) for LUN_1. Additionally, the association entry 340(2) identifies an association 320 between the policy group 100 and the storage object 120(A) for LUN_2. Furthermore, the association entry 340(3) identifies an association 320 between the policy group 100' and the storage object 120(B) for LUN_1. Also, the association entry 340(4) identifies an association 320 between the policy group 100' and the storage object 120(B) for LUN_2, and so on.

As described earlier in connection with FIG. 9, the replication direction between the storage object 120(A) for LUN_1 and the storage object 120(B) for LUN_1 is now in the opposite direction. That is, the storage object 120(B) for LUN_1 is now the replication source, and the storage object 120(A) for LUN_1 is now the replication destination. Accordingly, the association entry 340(1) now indicates that the policy group 100 assigned to the storage object 120(A) for LUN_1 is inactive, and the association entry 340(2) now indicates that the policy group 100' assigned to the storage object 120(B) for LUN_1 is active. Thus, the data protection rules 110 identified by the policy group 100 are no longer applied to the storage object 120(A) for LUN_1, and the data protection rules 110 identified by the policy group 100' are currently applied to the storage object 120(B) for LUN_1.

It should be understood that the metadata 330 as illustrated in FIG. 10 was provided by way of example only, and that there are other ways of managing the associations 320 among the data storage arrays 24. For example, in other arrangements, each data storage array 24 stores a table that contains only local array data (e.g., the local associations 320, etc.). Additionally, in some arrangements, such a table does not track storage_object-to-policy_group associations but instead a storage object table that contains policy group IDs is used to point to entries in a policy group table. Such alternative configurations are considered suitable for supporting certain improvements disclosed herein.

Figure 11:
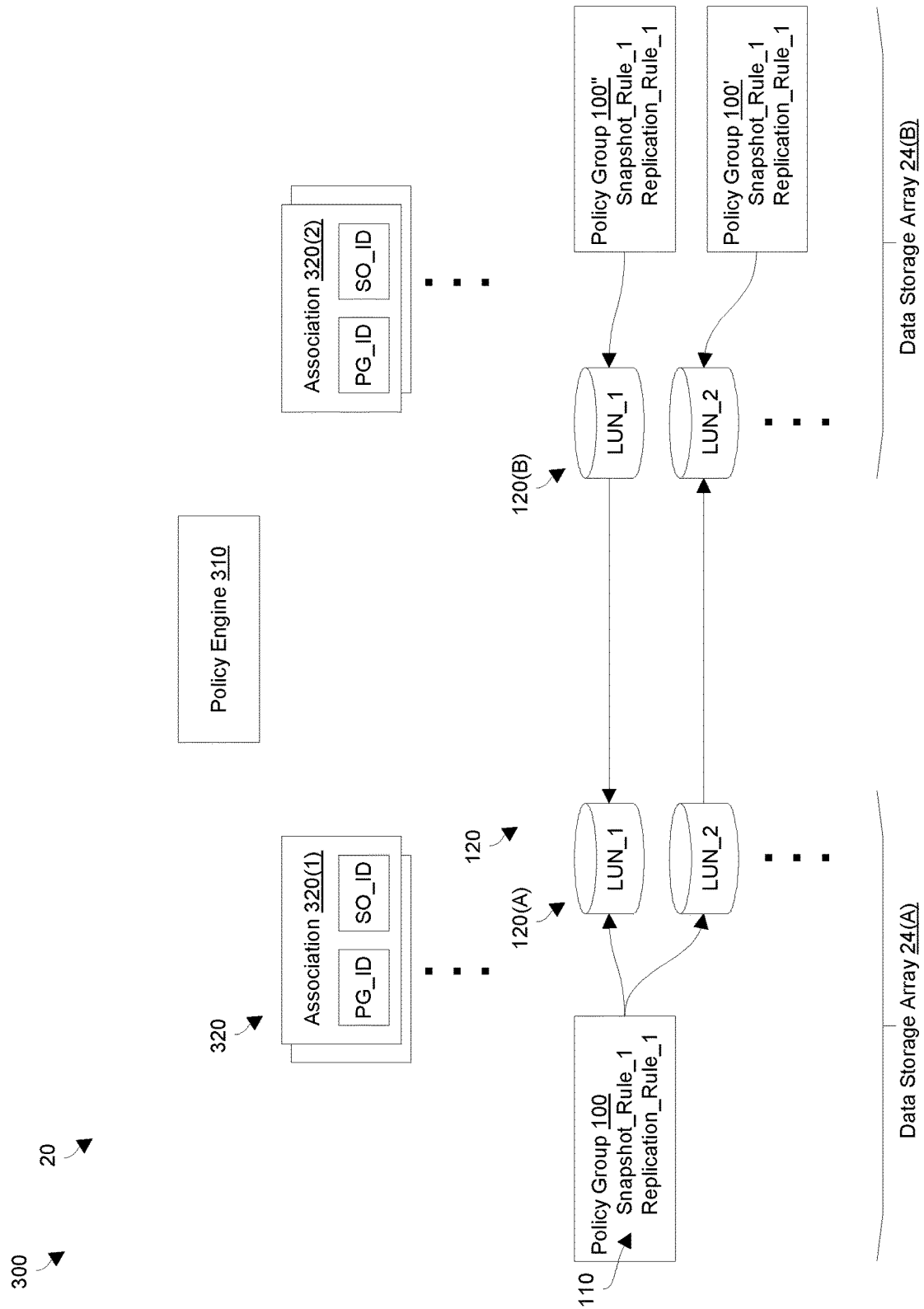
FIG. 11 is a block diagram illustrating further details of the replication situation.

FIG. 11 shows the replication situation 300 when a user attempts to make a direct modification to the policy group 100' while the policy group 100' is applied to a source storage object, e.g., the storage object 120(B) LUN_1. For example, the user may wish to add data protection rule 110, delete a data protection rule 110, and/or modify a data protection rule 110 of the policy group 100'.

Recall that the policy engine 310 prevents the user from directly modifying the policy group 100' (i.e., the policy group 100' is set to read only from the perspective of the user). Accordingly, to accommodate the user's modification, the policy engine 310 copies the policy group 100' to form a policy group copy 100" (or simply policy group 100") and adjusts the privileges of the policy group copy 100" to enable the user to directly modify the policy group copy 100". Additionally, the policy engine 310 updates the association entry 340(4) within the metadata 330 (also see FIG. 10) to indicate that the policy group copy 100" is now being applied to the storage object 120(B) for LUN_1.

As a result, the read only policy group 100' remains assigned to the storage object 120(B) LUN_2 which is still a destination storage object. However, the write and read policy group 100" is now assigned to the storage object 120(B) LUN_1 which is now a source storage object and can now have data protection modifications made thereto.

One should appreciate that situations may arise in which a policy group 100 becomes orphaned. For example, a source policy group 100 may be deleted while the data storage array 24 is down. In such a situation, the policy engine 310 periodically finds and removes orphaned policy groups 100.

In some arrangements, the policy engine 310 only deletes orphaned policy groups 100 on the replica side. In such arrangements, the primary side (or first policy group) can be standalone.

Such cleanup operations may be based on the last time each policy group 100 was updated and perhaps other criteria (e.g., whether the policy group is on the primary or replica side). Along these lines, the policy engine 310 may delete any policy group 100 that has not been updated within a predefined amount of time (e.g., 1 month, 2 weeks, etc.). Further details will now be provided with reference to FIG. 12.

Figure 12:
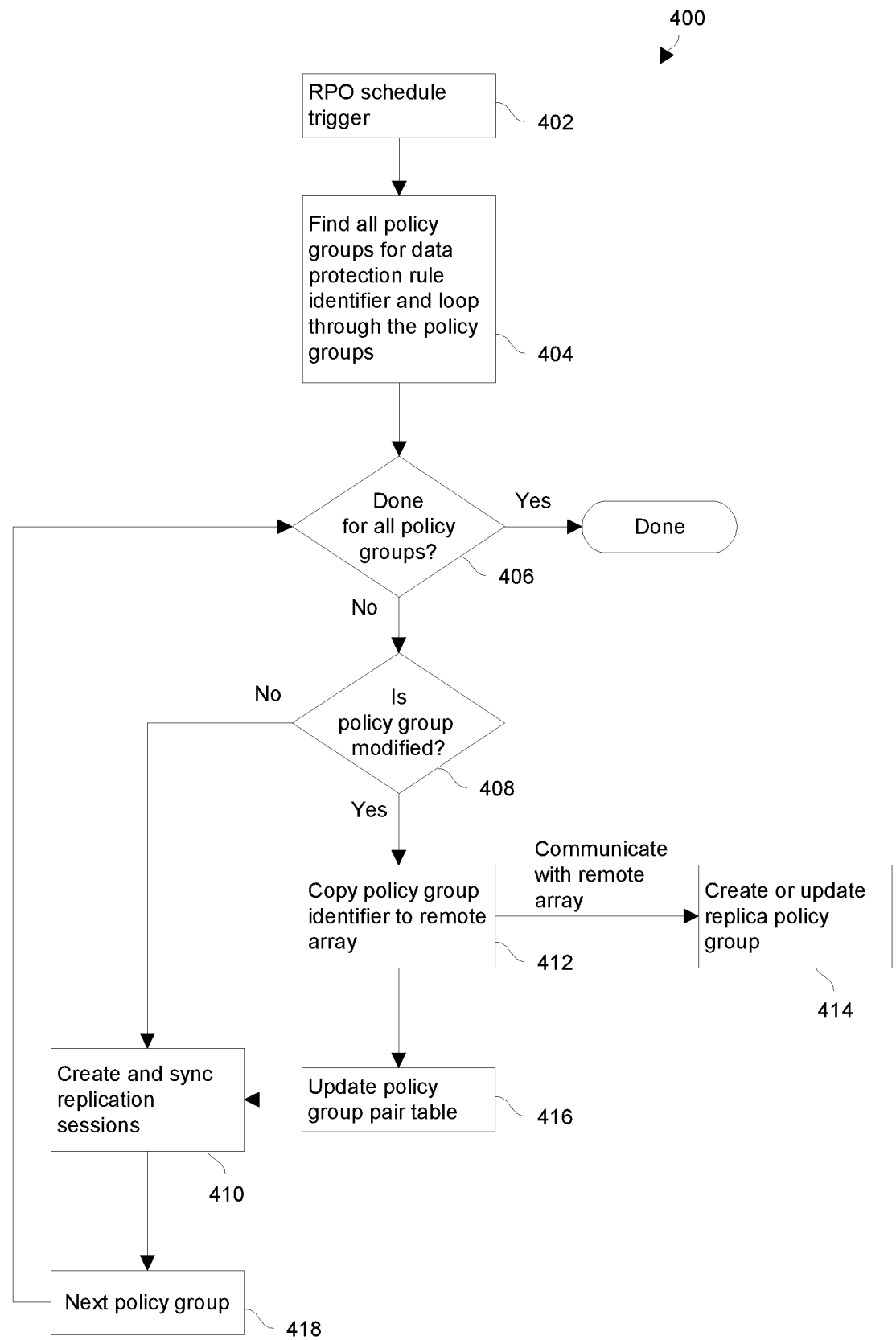
FIG. 12 is a flowchart of another procedure which is performed by the data storage equipment of FIG. 2.

FIG. 12 shows particular details of a procedure 400 which is performed by a replication-related service such as an RPO (recovery point objective) handler when enforcing the RPO for a particular data protection rule 110. Such a service may be provided by the policy engine 310 and/or other components of a data storage array 24.

At 402, the procedure 400 begins. In particular, the procedure 400 may be triggered in response to the RPO schedule for the particular data protection rule 110.

At 404, the service finds all policy groups that include the particular data protection rule 110. For example, the service may create a list or array of policy groups.

Starting at 406, the service cycles through for each policy group that was found. If there were no policies found, the service is finished. However, if there was at least one policy group found, 406 proceeds to 408.

At 408, for a particular policy group that was found, the service determines whether that policy group has been modified (and further details will be provided shortly). If not, the procedure proceeds to 410. However, if that policy group has been modified, the procedure proceeds to 412.

At 412, the service communicates a copy of the policy group identifier (or the policy group itself) to the remote data storage array 24. Upon receipt at 414, the remote data storage array 24 creates (or updates) a replica policy group.

At 416, after the service communicates the copy of the policy group to the remote data storage array 24, the service updates the policy group pair table, e.g., the metadata 330.

At 410, the service creates and synchronizes or syncs replication sessions.

At 418, the service proceeds to the next policy group that was found for the particular data protection rule 110.

It should be understood that the service is invoked again in the future, e.g., at each RPO cycle of the policy engine 310.

Further Details

Figure 13:
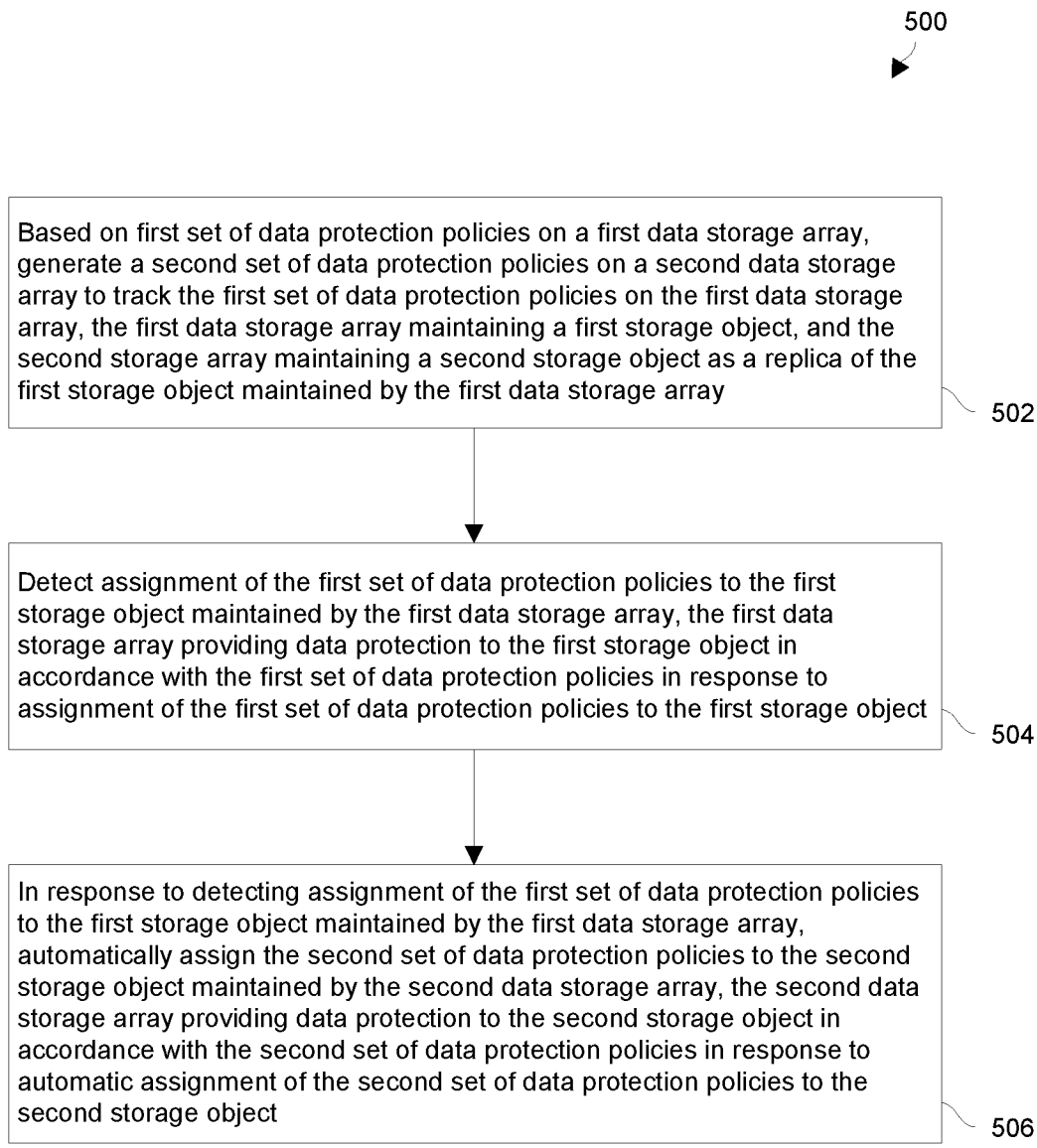
FIG. 13 is a flowchart of yet another procedure which is performed by the data storage equipment of FIG. 2.

FIG. 13 shows a procedure 500 for providing data protection among replicated storage objects maintained by data storage arrays. In particular, the procedure 500 enables automatic assignment of a data protection policy group/rule to a destination storage object in response to assignment to a source storage object. The procedure 500 is performed by circuitry of the data storage environment 20 such as the policy engine 310 (also see FIG. 8).

At 502, the circuitry generates, based on a first set of data protection policies on a first data storage array, a second set of data protection policies on a second data storage array to track the first set of data protection policies on the first data storage array (also see FIG. 8). The first data storage array maintains a first storage object (e.g., the storage object 120(A) for LUN_1), and the second data storage array maintains a second storage object (e.g., the storage object 120(B) for LUN_1) as a replica of the first storage object maintained by the first data storage array.

At 504, the circuitry detects assignment of the first set of data protection policies to the first storage object maintained by the first data storage array (e.g., the policy group 100). The first data storage array provides data protection to the first storage object in accordance with the first set of data protection policies in response to assignment of the first set of data protection policies to the first storage object.

At 506, the circuitry, in response to detecting assignment of the first set of data protection policies to the first storage object maintained by the first data storage array, automatically assigns the second set of data protection policies (e.g., the policy group 100') to the second storage object maintained by the second data storage array. The second data storage array provides data protection to the second storage object in accordance with the second set of data protection policies in response to automatic assignment of the second set of data protection policies to the second storage object.

As described above, improved techniques provide automatic assignment of data protection policies (or rules), which are assigned to source storage objects 120 on local data storage arrays 24, to corresponding destination storage objects 120 on remote data storage arrays 24 (i.e., replicated storage objects). Accordingly, if there is a failover event that causes a host computer to lose access to a source storage object 120 on a local data storage array 24 and then access the corresponding destination storage object 120 on a remote data storage array 120 as a new primary source of host data (e.g., after failover), the corresponding destination storage object 120 automatically receives the same data protection level as the original source storage object 120. Such techniques not only remove the manual human administrator steps (e.g., manually entering individual commands) to configure data protection on replicated host data when the replicated host data becomes the new primary source, but also allow the same levels of local and remote data protection to be provided to source and destination storage objects 120.

It should be understood that the techniques disclosed herein involve an improvement to the technology. Along these lines, with the above-described techniques, a data storage array 24 enjoys robust and reliable data protection of one or more storage objects 120 based on specialized constructs, i.e., policy groups 100 where each policy group 100 is able to identify multiple data protection rules 110. Moreover, if a policy group 100 is assigned to a source storage object 120, the same level of data protection is provided to the corresponding destination storage object 120 of the replication pair. Such a change to how the data storage array 24 operates improves data storage array organization and efficiency.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One should appreciate that, in accordance with certain embodiments, a user defined policy can be used to protect multiple storage resources on a single storage array. Both local and remote protection rules can be defined in a policy. Once a policy is applied to a storage resource, the resource is automatically protected locally with regularly scheduled snapshots based on the local snap rules, and remotely via replication sessions that are created by the policy engine based on the remote replication rules. The replication sessions replicate local storage data changes to one or more remote arrays at recovery point objective (RPO) intervals as defined in the remote replication rules.

In accordance with certain embodiments, a policy includes multiple snap and replication rules. Each snap rule can be used to define a snapshot schedule with an hourly interval or once a day schedule at a certain time of the day. Snapshot retention periods can also be added to each snap rule. Each replication rule consists of a RPO interval and a remote array. Multiple replication rules can be added to a policy to support 1-to-N fan out replication configuration.

After a policy with a replication rule is applied to a local resource, a policy orchestration engine creates (i) a peer resource on the remote array, and (ii) a replication session on both the local and remote arrays to capture the peer relationship between the local storage resource and the remote resource on the peer array. Data is synchronized from the local array to the remote array on an interval cadence defined by the RPO in the replication rule.

One should appreciate that a user defined policy can be used to protect multiple storage resources on a single storage array. Both local and remote protection rules can be defined in a policy group. Once a policy group is applied to a storage resource, the resource is automatically protected locally with regularly scheduled snapshots based on the local snap rules, and remotely via replication sessions that are created by the policy engine based on the remote replication rules. The replication sessions replicate local storage data changes to one or more remote arrays at the recovery point objective (RPO) intervals as defined in the remote replication rules.

A policy group may include multiple snap and replication rules. Each snap rule may define a snapshot schedule with an hourly interval or once a day schedule at a certain time of the day. Snapshot retention periods can also be added to each snap rule. Each replication rule may define of a RPO interval and a remote array. Multiple replication rules can be added to a policy to support 1 to N fan out replication configuration.

After a policy group with a replication rule is applied to a local resource, a policy orchestration engine can create a peer resource on the remote array, and a replication session on both the local and remote arrays to capture the peer relationship between the local storage resource and the remote resource on the peer array. The replication destination resource is used to store replicating data and is read-only to end users. The destination resource, when created, does not have a policy group associated. Without a policy group, the resource is not protected when the replication session fails over and reverses direction. Manual user steps are needed to apply a policy group on that resource for local and remote protection. Replication session failover and reversing direction is required in many use cases, including lengthy maintenance on the source array or a regular site swap between the source and destination sites.

In accordance with certain embodiments disclosed herein, the policy engine provides data protection on the original destination resource when the replication session fails over and reverses direction (e.g., also see FIGS. 8 and 9). The policy engine not only removes the manual user step to apply a policy group at the replication destination resource to protect the resource when the replication session direction is reversed, but also allows the same level of local and remote protections on the source and destination resources.

Along these lines, a replica policy group on the remote array is used to automatically protect the destination resource. The replica policy group is created and maintained by the policy engine to track the source policy. When user applies the source policy group to a storage resource, the replica policy group would be automatically applied to the peer resource on the remote array. The replica policy group is read-only to end users and can only be updated and deleted by the policy engine on the source array. The replica policy group cannot be removed from a destination resource before the replication session direction is reversed. A policy remains inactive unless the resource it is applied to is a primary resource (i.e. a replication source object).

In addition, any changes on the source policy group are replicated to the replica policy group so that both local and remote protection levels are kept to be the same. Once the direction of the replication session is reversed, the destination resource becomes a primary object, and the replica policy is active automatically to provide the same level of protection support for scheduled snapshots and RPO scheduled data replication to the original source array (e.g., see FIG. 9).

In accordance with certain embodiments, the life cycle of a replica policy group is managed by the policy engine and no user intervention is required (also see FIG. 11). Rather, various lower level details may be made transparent to the simple user.

In some embodiments, for manageability and reducing resource consumption, it is necessary for a source policy group to have no more than one replica policy group on the same remote array. A policy model and a policy group copy API are introduced below to allow the policy engine to manage source and replica policy group relationship efficiently.

Each pair of the source and the replica policy group or rule have the same globally unique "signature" field. A policy group copy API is used to either create or update the replica policy groups and rules. The policy group copy API input parameter contains all the information needed to create or update the replica policy groups and rules within. The copy API should have the following characteristics.

It is idempotent i.e., no side effects when the API is called multiple times

If an entry with the "signature" does not yet exist, a new replica rule or policy group is created.

If an entry with the "signature" already exists, the replica rule and/or policy group is updated based on the "last_update_time" and the "last_sync_time" maintained in the separate policy pair table.

This algorithm guarantees that only one replica entry for a source policy group or rule exists on a single remote system.

In a typical flow, replica policy group tracks the source policy group at all times.

1. The replica policy group is created when either of the following 2 actions occur on the source array.

a. The source policy group is created with a replication rule.

b. A replication rule is added to the source policy group.

2. The replica policy group is modified and updated when the source policy group is modified, including the following source policy group modifications.

a. Snapshot rules are added or removed from the source policy group.

b. A snapshot rule is modified, including changes of snapshot interval or time of the day, and snapshot retention period.

c. Replication rule RPO interval changes.

3. The replica policy group is deleted when either one of the following changes to the source policy group are made by a user.

a. The replication rule is removed from the source policy group.

b. The remote system of the replication rule is changed to point to a different array.

i. In this case, the replica policy group on the remote array being replaced is deleted and a new replica policy group on the new remote array is created.

c. The source policy group is deleted.

It should be understood that certain variations may be suitable for use by the copy API. For example, instead of creating a new replica rule or policy group if the "signature" does not yet exist (as mentioned above), an association table may be used. Here, the policy engine looks up the source rule/policy group ID. To this end, the data storage arrays may use identifiers (IDs) which are globally unique.

It should be understood that network disruption, however, can temporarily fail replica policy group update when the source policy group changes. As such, each array maintains a separate policy group pair table as shown above, where the "last_sync_time" marks the last time the source policy group content is copied to the replica policy group. The "last_update_time" for policy group or rule entity is set whenever there is a change on the policy group or rule properties. If the "last_update_time" in a source policy group is later than the "last_sync_time" in the association table, the source policy group needs to be copied over to the replica side.

To tolerate network faults, RPO interval handler is leveraged to repeatedly call policy group copy API if needed to make sure that the replica policy is updated/created before the replication session is created and data synchronized (e.g., also see FIG. 11). With this approach, the replica policy is updated whenever network issues are resolved, and the replica policy group is always created before the replication destination resource is created. The policy engine makes sure that the replica policy is attached to the replica resource before marking the replication session creation as finished. As a result, the replication destination resource is protected via the replica policy group as soon as it is created or used in the replication session.

In other arrangements, the RPO interval handler does not repeatedly call the policy group copy API. Rather, a separate background thread is used instead.

The following flow chart shows how remote replica policy groups are updated at each RPO cycle of the policy engine.

In rare cases, replica policy groups may be left on an array as orphans. This can happen, for example, when the source policy is deleted while the remote array is down. To solve this, a background aging service can be used to clean up the orphaned replica policy groups periodically. For example, the aging service can run once a week to delete all unused replica policy groups that have the "last_update_time" at a pre-determined number of days (e.g. 14 days) ago.

In some embodiments, the data storage environment 20 is provided with a process to automatically protect replication resources when failing over the replication session in the reversed direction.

A replica policy group is created on the remote array to track the source policy group and provide protection to the replication destination resource by default.

The replica policy group is managed by policy engine without user input.

The replica policy group has the same protection level as the source policy group.

Each source policy group has at most one replica policy group on one remote array.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

In some situations, each data storage array 24 manages and provides data protection for both block-based and filed-based storage objects 120. Moreover, in some situations, a data storage array 24 manages production data on behalf of a set of host computers 22 as well as replicated data on behalf of a set of other data storage arrays 24.

Additionally, in some arrangements, data protection rules can be applied directly to storage objects. In other arrangements, data protection rules are applied indirectly to storage objects (e.g., via associations) which are managed by a policy engine.

Furthermore, it should be understood that the above-described data protection rules and policy groups may be un-assigned from storage objects. For example, if a storage object is to be deleted, a user may un-assign all rules and/or policy groups from the storage object before deleting the storage object. Similarly, if certain data protection is no longer needed for a storage object, the user may un-assign a particular rule and/or policy group from that storage object to remove that data protection. Such modifications and enhancements are intended to belong to various embodiments of the disclosure.

What is claimed is:

1. A method of providing data protection among data storage arrays, the method comprising:
    based on a first set of data protection policies on a first data storage array, generating, by a policy engine, a second set of data protection policies on a second data storage array to track the first set of data protection policies on the first data storage array, the first data storage array maintaining a first storage object, and the second data storage array maintaining a second storage object as a replica of the first storage object maintained by the first data storage array;
    detecting, by the policy engine, assignment of the first set of data protection policies to the first storage object maintained by the first data storage array, the first data storage array providing data protection to the first storage object in accordance with the first set of data protection policies in response to the assignment of the first set of data protection policies to the first storage object; and
    in response to detecting the assignment of the first set of data protection policies to the first storage object maintained by the first data storage array, automatically assigning, by the policy engine, the second set of data protection policies to the second storage object maintained by the second data storage array, the second data storage array providing data protection to the second storage object in accordance with the second set of data protection policies in response to the automatic assignment of the second set of data protection policies to the second storage object;
    wherein each data storage array of the first data storage array and the second data storage array is constructed and arranged to (i) apply a set of data protection policies to a storage object maintained by that data storage array when the set of data protection policies is assigned to that storage object and when that storage object is a replication source, and (ii) delay applying the set of data protection policies to that storage object maintained by that data storage array when the set of data protection policies is assigned to that storage object and when that storage object is a replication destination;
    wherein the first storage object initially is a replication source;
    wherein the first data storage array applies the first set of data protection policies to the first storage object in accordance with the first set of data protection policies in response to (i) assignment of the first set of data protection policies to the first storage object and (ii) the first storage object initially being a replication source; and wherein the second storage object initially is a replication destination, and wherein automatically assigning the second set of data protection policies to the second storage object maintained by the second data storage array includes:

delaying applying the second set of data protection policies to the second storage object maintained by the second data storage array in response to (i) assignment of the second set of data protection policies to the second storage object and (ii) the second storage object initially being a replication destination.

2. A method as in claim 1 wherein the first set of data protection policies includes a first policy group identifying multiple data protection rules; and wherein generating the second set of data protection policies on the second data storage array to track the first set of data protection policies on the first data storage array includes:

forming, as at least a portion of the second set of data protection policies, a second policy group based on the first policy group, the second policy group identifying the multiple data protection rules.

3. A method as in claim 2 wherein, during assignment of the first set of data protection policies to the first storage object, the policy engine generates a first data protection association having a first policy group identifier that uniquely identifies the first policy group among other policy groups and a first storage object identifier that uniquely identifies the first storage object among other storage objects, the first data protection association being used by the data storage arrays to manage data protection for the first storage object; and wherein automatically assigning the second set of data protection policies to the second storage object maintained by the second data storage array further includes:

generating a second data protection association having a second policy group identifier that uniquely identifies the second policy group among the other policy groups and a second storage object identifier that uniquely identifies the second storage object among the other storage objects, the second data protection association being used by the data storage arrays to manage data protection for the second storage object.

4. A method as in claim 2 wherein the first policy group identifies, as the multiple data protection rules, multiple snapshot rules, each of the multiple snapshot rules specifying a different snapshot creation schedule to routinely create snapshots of a storage object on a local data storage array; and wherein forming the second policy group based on the first policy group includes:

configuring the second policy group to identify the multiple snapshot rules identified by the first policy group.

5. A method as in claim 2 wherein the first policy group identifies, as the multiple data protection rules, multiple replication rules, each of the multiple replication rules defining different replication criteria to replicate a storage object to a remote data storage array; and wherein forming the second policy group based on the first policy group includes:

configuring the second policy group to identify the multiple replication rules identified by the first policy group.

6. A method as in claim 2 wherein the first policy group identifies, as the multiple data protection rules, at least one snapshot rule and at least one replication rule, each snapshot rule identified by the first policy group specifying a different snapshot creation schedule to routinely create snapshots of a storage object on a local data storage array, and each replication rule identified by the first policy group defining different replication criteria to replicate a storage object to a remote data storage array; and wherein forming the second policy group based on the first policy group includes:

configuring the second policy group to identify each snapshot rule and each replication rule identified by the first policy group.

7. A method as in claim 2, further comprising:

detecting a data protection rule modification to the first policy group, and in response to detecting the data protection rule modification to the first policy group, making a corresponding data protection rule modification to the second policy group.

8. A method as in claim 7 wherein making the corresponding data protection rule modification to the second policy group includes:

changing at least one data protection rule identified by the second policy group while the second policy group is assigned to the second storage object.

9. A method as in claim 7 wherein making the corresponding data protection rule modification to the second policy group includes:

changing at least one data protection rule identified by the second policy group to match the data protection rules identified by the second policy group with the data protection rules identified by the first policy group.

10. A method as in claim 9 wherein the first data storage array is constructed and arranged to process block-based input/output (I/O) requests on behalf of a set of host computers;

wherein the first storage object is a first logical unit of storage (LUN) that stores host data based on the block-based I/O requests; and wherein the second storage object is a second LUN that stores host data based on the block-based I/O requests, the second LUN being different from the first LUN.

11. A method as in claim 9 wherein the first data storage array is constructed and arranged to process file-based input/output (I/O) requests on behalf of a set of host computers;

wherein the first storage object is a first file system that stores host data based on the file-based I/O requests; and wherein the second storage object is a second file system that stores host data based on the file-based I/O requests, the second file system being different from the first file system.

12. A method as in claim 2 wherein the first data storage array and the second data storage array replicate data from the first storage object to the second storage object in accordance with the first policy group during a first time period; and wherein the method further comprises:

during a second time period that is after the first time period, detecting that the second storage object has become the replication source and that the first storage object has become the replication destination.

13. A method as in claim 12, further comprising:
during the second time period and in response to detecting that (i) the second storage object has become the replication source and (ii) the first storage object has become the replication destination, automatically applying the second policy group to the second storage object, the first data storage array and the second data storage array replicating data from the second storage object to the first storage object in response to applying the second policy group to the second storage object.

14. A method as in claim 13 wherein the policy engine configures metadata privileges to allow a user to directly make a data protection rule modification to the first policy group; and
wherein forming the second policy group includes:
configuring the metadata privileges to prevent a user from directly making a data protection rule modification to the second policy group.

15. A method as in claim 14, further comprising:
during a third time period that is after the second time period, receiving a user command to modify data protection imposed on the second storage object, and
based on the metadata privileges and the user command, (i) creating a third policy group that includes at least one data protection rule that is different from the multiple data protection rules identified by the second policy group, (ii) configuring the metadata privileges to allow a user to directly make a data protection rule modification to the third policy group, (iii) terminating application of the second policy group to the second storage object, and (iv) applying the third policy group to the second storage object in place of the second policy group.

16. A method as in claim 2, further comprising:
periodically performing an orphan policy group cleanup operation to delete orphan policy groups from one or more of the data storage arrays, the orphan policy group cleanup operation (i) identifying last update times for the first policy group and the second policy group and (ii) evaluating whether to delete the first policy group and the second policy group based on the last update times.

17. A method as in claim 1 wherein the policy engine is external to the first data storage array and the second data storage array; and
wherein generating the second set of data protection policies includes:
forming, as the second set of data protection policies on the second data storage array and by the policy engine, a copy of the first set of data protection policies.

18. A method as in claim 1 wherein at least a portion of the policy engine resides within one of the first data storage array and the second data storage array; and
wherein generating the second set of data protection policies includes:
forming, as the second set of data protection policies on the second data storage array and by the policy engine, a copy of the first set of data protection policies.

19. Data storage equipment, comprising:
memory; and
control circuitry coupled to the memory, the memory storing instructions which, when carried out by the control circuitry, cause the control circuitry to:
based on a first set of data protection policies on a first data storage array, generate a second set of data protection policies on a second data storage array to track the first set of data protection policies on the first data storage array, the first data storage array maintaining a first storage object, and the second data storage array maintaining a second storage object as a replica of the first storage object maintained by the first data storage array;
detect assignment of the first set of data protection policies to the first storage object maintained by the first data storage array, the first data storage array providing data protection to the first storage object in accordance with the first set of data protection policies in response to the assignment of the first set of data protection policies to the first storage object; and
in response to detecting the assignment of the first set of data protection policies to the first storage object maintained by the first data storage array, automatically assign the second set of data protection policies to the second storage object maintained by the second data storage array, the second data storage array providing data protection to the second storage object in accordance with the second set of data protection policies in response to the automatic assignment of the second set of data protection policies to the second storage object;
wherein each data storage array of the first data storage array and the second data storage array is constructed and arranged to (i) apply a set of data protection policies to a storage object maintained by that data storage array when the set of data protection policies is assigned to that storage object and when that storage object is a replication source, and (ii) delay applying the set of data protection policies to that storage object maintained by that data storage array when the set of data protection policies is assigned to that storage object and when that storage object is a replication destination;
wherein the first storage object initially is a replication source;
wherein the first data storage array applies the first set of data protection policies to the first storage object in accordance with the first set of data protection policies in response to (i) assignment of the first set of data protection policies to the first storage object and (ii) the first storage object initially being a replication source; and
wherein the second storage object initially is a replication destination, and
wherein the control circuitry, when automatically assigning the second set of data protection policies to the second storage object maintained by the second data storage array, is constructed and arranged to:
delay applying the second set of data protection policies to the second storage object maintained by the second data storage array in response to (i) assignment of the second set of data protection policies to the second storage object and (ii) the second storage object initially being a replication destination.

20. A computer program product having a non-transitory computer readable medium which stores a set of instructions to provide data protection among data storage arrays; the set of instructions, when carried out by data storage equipment, causing the data storage equipment to perform a method of:

based on a first set of data protection policies on a first data storage array, generating a second set of data protection policies on a second data storage array to track the first set of data protection policies on the first data storage array, the first data storage array maintaining a first storage object, and the second data storage array maintaining a second storage object as a replica of the first storage object maintained by the first data storage array;

detecting assignment of the first set of data protection policies to the first storage object maintained by the first data storage array, the first data storage array providing data protection to the first storage object in accordance with the first set of data protection policies in response to the assignment of the first set of data protection policies to the first storage object; and in response to detecting the assignment of the first set of data protection policies to the first storage object maintained by the first data storage array, automatically assigning the second set of data protection policies to the second storage object maintained by the second data storage array, the second data storage array providing data protection to the second storage object in accordance with the second set of data protection policies in response to the automatic assignment of the second set of data protection policies to the second storage object;

wherein each data storage array of the first data storage array and the second data storage array is constructed and arranged to (i) apply a set of data protection policies to a storage object maintained by that data storage array when the set of data protection policies is assigned to that storage object and when that storage object is a replication source, and (ii) delay applying the set of data protection policies to that storage object maintained by that data storage array when the set of data protection policies is assigned to that storage object and when that storage object is a replication destination;

wherein the first storage object initially is a replication source;

wherein the first data storage array applies the first set of data protection policies to the first storage object in accordance with the first set of data protection policies in response to (i) assignment of the first set of data protection policies to the first storage object and (ii) the first storage object initially being a replication source; and wherein the second storage object initially is a replication destination, and wherein automatically assigning the second set of data protection policies to the second storage object maintained by the second data storage array includes:

delaying applying the second set of data protection policies to the second storage object maintained by the second data storage array in response to (i) assignment of the second set of data protection policies to the second storage object and (ii) the second storage object initially being a replication destination.

* * * * *